(12) United States Patent
McNeel

(10) Patent No.: US 12,165,121 B2
(45) Date of Patent: *Dec. 10, 2024

(54) LOCATION BASED SYSTEM AND METHOD FOR CALCULATING SALES AND USE TAX

(71) Applicant: GEOINVOICE, INC., Tomball, TX (US)

(72) Inventor: Susette M. McNeel, Pinehurst, TX (US)

(73) Assignee: GEOINVOICE, INC., Tomball, TX (US)

( * ) Notice: Subject to any disclaimer, the term of this patent is extended or adjusted under 35 U.S.C. 154(b) by 862 days.

This patent is subject to a terminal disclaimer.

(21) Appl. No.: 16/942,741

(22) Filed: Jul. 29, 2020

(65) Prior Publication Data
US 2020/0356974 A1    Nov. 12, 2020

Related U.S. Application Data

(60) Division of application No. 15/413,783, filed on Jan. 24, 2017, now Pat. No. 10,769,611, which is a
(Continued)

(51) Int. Cl.
*G06Q 40/00* (2023.01)
*G06F 16/29* (2019.01)
(Continued)

(52) U.S. Cl.
CPC ........... *G06Q 20/207* (2013.01); *G06F 16/29* (2019.01); *G06Q 20/202* (2013.01);
(Continued)

(58) Field of Classification Search
CPC .. G06F 16/29; G06Q 20/202; G06Q 20/3224; G06Q 20/405; G06Q 40/123;
(Continued)

(56) References Cited

U.S. PATENT DOCUMENTS 5,710,887 A     1/1998  Chelliah et al.
7,272,577 B1 *  9/2007  LaMotta ................ G06Q 40/02
                                                    705/31

(Continued)

OTHER PUBLICATIONS

Washington State Geospatial Clearinghouse, MetaData, Cities (Sales and Use Tax), 2014, Washington State Department of Revenue, Washington, http://dor.wa.gov/content/FindTaxesAndRates/stshpdownloads.aspx.
(Continued)

*Primary Examiner* — Talia F Crawley
(74) *Attorney, Agent, or Firm* — The Roy Gross Law Firm, LLC; Roy Gross

(57) ABSTRACT

Methods and systems for a location based system and method for calculating sales and use tax for non-traditional points of sale. The methods and systems include a mobile application, a non-transitory computer readable medium for calculating sales and use tax for businesses that do not have a human readable address. Methods and systems for calculating a transactional tax for a mobile app whereby the mobile app is taxed based upon the location of the mobile device or place of first use of the mobile app, rather than where the mobile device was purchased or where it originates.

11 Claims, 30 Drawing Sheets

Related U.S. Application Data continuation-in-part of application No. 14/731,663, filed on Jun. 5, 2015, now Pat. No. 9,589,259.

(60) Provisional application No. 62/008,793, filed on Jun. 6, 2014.

(51) Int. Cl.

| | |
|---|---|
| *G06Q 20/20* | (2012.01) |
| *G06Q 20/32* | (2012.01) |
| *G06Q 20/40* | (2012.01) |
| *G06Q 40/12* | (2023.01) |
| *H04W 4/02* | (2018.01) |
| *H04W 4/021* | (2018.01) |
| *H04W 4/029* | (2018.01) |
| *G06Q 30/0201* | (2023.01) |

(52) U.S. Cl.
CPC ....... *G06Q 20/3224* (2013.01); *G06Q 20/405* (2013.01); *G06Q 40/123* (2013.12); *H04W 4/02* (2013.01); *H04W 4/021* (2013.01); *H04W 4/029* (2018.02); *G06Q 30/0201* (2013.01)

(58) Field of Classification Search
CPC .... G06Q 30/0201; H04W 4/02; H04W 4/021; H04W 4/029
See application file for complete search history.

(56) References Cited

U.S. PATENT DOCUMENTS

| | | | |
|---|---|---|---|
| 7,395,151 B2 | 7/2008 | O'Neill et al. | |
| 7,725,529 B2 | 5/2010 | Yang et al. | |
| 7,783,536 B2* | 8/2010 | William | G06Q 40/123 705/417 |
| 7,933,803 B1* | 4/2011 | Nadler | G06Q 40/02 705/31 |
| 8,620,578 B1 | 12/2013 | Brown et al. | |
| 8,725,407 B2 | 5/2014 | Hurley et al. | |
| 8,732,219 B1 | 5/2014 | Ferries et al. | |
| 8,868,479 B2 | 10/2014 | Mitchell et al. | |
| 8,875,990 B2 | 11/2014 | Bishop et al. | |
| 8,983,494 B1 | 3/2015 | Onnen et al. | |
| 9,338,594 B1 | 5/2016 | Onnen et al. | |
| 2002/0116302 A1* | 8/2002 | Wilmes | G06Q 20/207 705/417 |
| 2002/0178117 A1* | 11/2002 | Maguire | G06Q 20/102 705/40 |
| 2003/0101112 A1* | 5/2003 | Gallagher | G06Q 20/207 705/31 |
| 2003/0126018 A1 | 7/2003 | LaMotta | |
| 2003/0195780 A1* | 10/2003 | Arora | G06Q 10/06 705/35 |
| 2003/0233297 A1* | 12/2003 | Campbell | G06Q 40/123 705/31 |
| 2004/0030619 A1 | 2/2004 | Stokes | |
| 2004/0111369 A1 | 6/2004 | Lane et al. | |
| 2004/0117358 A1* | 6/2004 | von Kaenel | G06Q 40/08 |
| 2004/0138817 A1 | 7/2004 | Zoken et al. | |
| 2005/0203768 A1 | 9/2005 | Florance et al. | |
| 2005/0216351 A1* | 9/2005 | Holbert | G06Q 20/207 705/19 |
| 2005/0288957 A1 | 12/2005 | Eraker | |
| 2005/0288958 A1 | 12/2005 | Eraker | |
| 2006/0095350 A1* | 5/2006 | Hall | G06Q 40/10 705/16 |
| 2006/0197781 A1 | 9/2006 | Arutunian | |
| 2006/0265197 A1* | 11/2006 | Peterson | H04N 19/96 703/2 |
| 2008/0059349 A1* | 3/2008 | Sweeney | G06Q 40/02 705/35 |
| 2008/0162407 A1* | 7/2008 | Bolton | G09B 29/003 |
| 2009/0144177 A1 | 6/2009 | Wiese | |
| 2009/0157518 A1 | 6/2009 | Bishop et al. | |
| 2009/0164325 A1 | 6/2009 | Bishop et al. | |
| 2009/0306961 A1 | 12/2009 | Li et al. | |
| 2010/0106580 A1 | 4/2010 | Etheredge et al. | |
| 2010/0153011 A1* | 6/2010 | Obrea | G06F 21/64 380/258 |
| 2010/0191674 A1* | 7/2010 | Condon | G06Q 50/06 705/413 |
| 2010/0211480 A1* | 8/2010 | Sindambiwe | G06Q 30/0601 705/26.1 |
| 2010/0235874 A1 | 9/2010 | Johnson et al. | |
| 2011/0153476 A1* | 6/2011 | Kuchs | G06Q 40/02 705/322 |
| 2011/0191215 A1 | 8/2011 | Nadler et al. | |
| 2011/0307359 A1 | 12/2011 | Gude et al. | |
| 2012/0016696 A1 | 1/2012 | Lee | |
| 2012/0290140 A1* | 11/2012 | Groeneveld | A01G 22/00 700/284 |
| 2012/0323749 A1* | 12/2012 | Lapidus | G06Q 40/123 705/31 |
| 2013/0013471 A1* | 1/2013 | Fishman | G06Q 40/00 705/31 |
| 2013/0029744 A1 | 1/2013 | Harding et al. | |
| 2013/0046634 A1* | 2/2013 | Grigg | G06Q 30/00 705/14.58 |
| 2013/0046635 A1 | 2/2013 | Grigg et al. | |
| 2013/0151439 A1 | 6/2013 | Galaska | |
| 2013/0317957 A1 | 11/2013 | Reahard et al. | |
| 2014/0201045 A1 | 6/2014 | Pai | |
| 2014/0279503 A1* | 9/2014 | Bertanzetti | G06Q 20/3221 705/44 |
| 2015/0228031 A1 | 8/2015 | Emison et al. | |
| 2015/0302411 A1 | 10/2015 | Bondesen et al. | |
| 2015/0356539 A1* | 12/2015 | McNeel | G06Q 20/3224 705/19 |
| 2016/0132857 A1* | 5/2016 | Unser | G06Q 20/12 705/39 |
| 2017/0352030 A1* | 12/2017 | Ferrilla | G06Q 20/20 |
| 2020/0356974 A1* | 11/2020 | McNeel | G06F 16/29 |

OTHER PUBLICATIONS

Watch Systems, LLC, TaxWatch Sales Tax Calculation System, 2015, http://www.taxwatch.biz/information.php.

CoreLogic, Sales and Use Tax, Tax Jurisdiction Layers, 2015, http://www.corelogic.com/products/sales-and-use-tax.aspx.

CoreLogic, Sales and Use Tax Layer, 2013, corelogic.com.

Avalara Help Center, Use Latitude and Longitude Coordinates, 2015, https://help.avalara.com/004_AvaTax_Integrations/QuickBooks/040_Learn_How_to_Use _.

Avalara Help Center, Specify Latitude/Longitude Coordinates, 2015, https://help.avalara.com/004_AvaTax_Integrations/Netsuite/003_Netsuite_User_Guide/010 . . . .

\* cited by examiner

Tax Area Number 10, State, County and City

GeoInvoice sales tax services login page

GeoInvoice Purchased Services

GeoInvoice database of saved locations

GeoInvoice partial text search of "Univer"

Results of partial text search

GeoInvoice tax output for selected location

GeoInvoice tax report for saved location

Geoinvoice input for known latitude and longitude

GeoInvoice input for known latitude and longitude

GeoInvoice tax rates for known latitude and longitude

Geoinvoice sales tax detail for known latitude and longitude in PDF for download GeoInvoice sales tax rates for a location

Rates Location

Latitude : 30.22025434303118

Longitude : -95.67957825967639

Select Tax Type : ● Sales ○ Use

This rate is effective for the period: 06/01/2015 - 06/30/2015

| Jurisdiction | Reporting Code | Tax Area | Tax Type | Rate Type | Tax Rate |
|---|---|---|---|---|---|
| State | | Texas | Sales and Use Tax | General Sales | 0.062500 |
| County | | Montgomery | Sales and Use Tax | General Sales | 0.000000 |
| SPD | 5170745 | Montgomery County EMS District 10 | Sales and Use Tax | General Sales | 0.010000 |
| | | | | Total Tax Rates | 0.0725 |

FIGURE 23

GeoInvoice user defined location stored in database

GeoInvoice user defined location record

GeoInvoice user defined sales tax rates

LOCATION BASED SYSTEM AND METHOD FOR CALCULATING SALES AND USE TAX

CROSS REFERENCE TO RELATED APPLICATIONS

This application is a divisional of U.S. application Ser. No. 15/413,783 filed Jan. 24, 2017, which is a continuation of a U.S. application Ser. No. 14/731,663 filed Jun. 5, 2015 (issued as U.S. Pat. No. 9,589,259), which claims priority to U.S. 62/008,793 filed Jun. 6, 2014. The contents of these applications are incorporated by reference in their entirety.

FIELD OF THE INVENTION

The invention generally relates to a location based system and method for calculating transaction taxes, i.e. sales and use tax. The invention further relates to geographic information systems, and more specifically, methods and systems for capturing geographic coordinates at the point of consummation of a transaction, and geospatially analyzing the geographic coordinate to determine if the geographic coordinate is within a transaction tax area or transaction tax areas. The invention generally relates to calculating transaction taxes at a non-traditional point of sale.

The invention further relates to calculating a transactional tax for a mobile app ("mobile software application") whereby the mobile app is taxed based upon the location of the mobile device or place of first use of the mobile app, rather than where the mobile device was purchased or where it originates.

BACKGROUND OF THE INVENTION

Transaction taxes are taxes that are not based on profitability but are imposed on a sales or use, exchange or barter of goods or services within a legally defined transaction tax area.

Conventional transaction tax solutions are designed to find sales tax rates based upon a known address or address ranges or at a traditional point of sale. Such addresses often can be provided with zip codes that were designed to deliver United States Postal Service mail.

However, zip codes and postal zones often overlap county and municipal boundaries. This creates inconsistent and unreliable results with regards to tax areas for transaction taxes as certain tax areas can overlap counties within the United States.

For example City ABC may overlap County 1 and County 2. Each county may impose no transaction tax, the same transaction tax or different transaction taxes. Relying on the city (and a zip code) as a location may provide accurate tax rates or inaccurate tax rates.

Known prior art references for transactional taxes include: U.S. Pat. No. 8,725,407 to Hurley; U.S. Pat. No. 8,620,578 to Brown; U.S. Pat. No. 7,783,536 to William et al.; U.S. Pat. No. 7,933,803 to Nadler et al.; U.S. Patent Publication No. 2011/0307359 to Gude et al.; U.S. Patent Publication No. 2011/0191215 to Nadler et al.; U.S. Patent Publication No. 2012/0323749; U.S. Patent Application No. 2013/0013471 to Fishman; U.S. Patent Application No. 2013/0151439 to Galaska.

These prior art systems are dependent on databases that include human readable addresses and use zip codes and postal addresses or address ranges and related interpolated geographic coordinates to set forth tax rates, such as transactional tax rates.

However, these prior art references do not effectively work for businesses that do not have a human readable address and as described below may return erroneous results. A human readable address is defined as a location linked to a dataset of known physical and cultural geographic features, locations, places, or addresses.

For example, an oil or gas well bore does not have a human readable address. A well bore does have a geographic coordinate. Additionally, mobile food vending trucks do not have a fixed address where a transaction is consummated. Furthermore, fair, festivals, markets and shows often do not have a human readable address.

In the United States there are currently five states (Alaska boroughs and cities do impose local sales and use taxes) that do not impose sales, use, gross receipts or other sales transaction tax. Forty-five states impose transaction taxes on the consummation of a sale. Where a sale is consummated is dependent on the State's legal definition of where a sale is consummated.

Twelve states define the consummation of sales where the order is taken. In this case, sales or use tax is imposed at the vendor's location where the order was taken for the sales or delivery of goods or services.

In contrast, thirty-three states define the consummation of a sale where the good or services are delivered.

To find sales tax rates for businesses that do not have a human readable address, a user, such as an account clerk, often spends hours looking up sales tax rates on state tax commission websites based on the state and county. This is a time consuming and arduous task and often inaccurate.

In the case of mobile apps ("mobile software application"), mobile apps and associated goods and services for mobile apps can be purchased when a user is at a place that does not have a human readable address or a place that is different than where the mobile device storing the apps was purchased.

The sourcing of software is dependent on state law. Many states have enacted laws define the sourcing of software is used or first used. Sales are sourced where the software or application is used. Some states source the sales or use tax to the location of the remote server if the software is not actually downloaded. Some states have enacted remote seller laws to capture a use tax on sales that occur within the state boundaries but made by an out-of-state seller. This creates confusion as often sales tax for mobile apps is not apportioned appropriately.

Consequently, there is a need for a system and method that enables a user to capture a geographic coordinate at a point where a transaction is consummated that is not included in a dataset of known physical and cultural geographic features, locations, places, or addresses and calculate the transaction tax based upon legal definitions of transaction tax in that point.

There is a need for a system and method that geospatially locates a place of consummation of a transaction by processing a geographic coordinate rather than by location place name, human readable address or zip code, will return only tax areas that the geographic coordinates are within.

There is a need for a system to calculate sales tax for a non-traditional point of sale.

There is a need for a system and method that allows sellers of mobile software applications to obtain the sales or use tax rates for the location of the mobile device so that sales or use taxes can be collected where the first use of the mobile application occurs.

The present invention intends to improve upon the prior art and to provide a method and system to find sales and use tax rates for businesses that do not have a human readable address.

Moreover, the present invention intends to improve upon the prior art and provide a method and system to calculate a transactional tax for a mobile app whereby the mobile software application is taxed based upon the location of the mobile device or place of first use of the mobile app, rather than where the mobile device was purchased or originates.

SUMMARY OF THE INVENTION

To improve upon the prior art, it is an object of the present invention to provide a location based system and method for calculating sales and use tax. It is another object of the invention to provide location based system and method for calculating sales and use tax for businesses that are not identified by a human readable address. It is another object of the invention to provide a system to calculate sales tax for a non-traditional point of sale.

It is another object of the present invention to provide a sales tax solution that is not based on relating a location to a database of known geographic features but is based on an almost infinite number of geographic coordinates within a tax area.

In general, embodiments of the present invention provide a system, method, apparatus, and non-transitory storage medium, computer program product, mobile application and software for calculating the transaction tax rate or transaction tax rates for a geographic coordinate that is within a legally defined geographic transaction tax area that imposes a transaction tax.

The invention is especially useful in destination based states. Service providers may deliver services using the invention's mobile service without regard to database of addresses, zip codes, GNIS features and any other dataset of known locations.

In certain embodiments of the invention, the geographic information system will geospatially analyze the geographic coordinate to determine what tax area or tax areas the device is within. The invention will return to the vendor the transaction tax rate for the processed geographic coordinate. In certain embodiments, such a technique is useful for non-traditional points of sale.

In certain embodiments, all users will have the option to save the current location for continued and future use.

The invention is superior to using a dataset of locations to determine transaction tax situs. For example, Census Bureau addresses were created to manage the Census Bureau's mail delivery and return operations. The Census Bureau relies upon a Master Address File (MAF) that was derived from postal service addresses. An address is not a position in a grid coordinate system; it is only a position in a series of ill-defined positions along a route. The location of an address is often ambiguous because street names are not unique, numbering schemes are inconsistent and because routes have two sides-left and right. Consequently, address parsing and chopping logic can result in unmapped locations or incorrect locations.

Zip codes were designed to deliver United States Postal Service mail. Zip codes postal zones often overlap county and municipal boundaries. This creates inconsistent and unreliable results.

State governments that administer sales and use taxes often provide erroneous location information based on addresses. In a recent hearing before Texas Comptroller's Office a taxpayer was audited for underpayment of sales tax. The Texas Comptroller's Sales Tax WebFiling system requires the taxpayer to enter its address into the State's Tax Rate Locator application to determine the correct sales tax rate. The taxpayer in Hearing Docket Number 304-13-3720 entered the correct address for its place of business into the Texas Comptroller's Tax Rate Locator Application. The Tax Rate Locator application failed to capture the fact that the taxpayer's sole place of business was also within the taxing jurisdiction of a city. The rate that the State's rate application returned was less than the correct rate. The taxpayer collected an incorrect rate of tax and was audited for underpayment of Texas sales and use tax. See Texas Comptroller of Public Accounts State Office of Administrative Hearing Docket Number 304-13-3720.26 CPA Hearing No. 108,538, Accession number: 201308755H, Aug. 6, 2013.

The United States Census Bureau Master Address File (MAF) derived from the United States Postal Service is composed of address ranges and not discreet address points. This database takes an address and determines the approximate location from a street centerline. An interpolated geographic coordinate (latitude/longitude) is returned with the address range. A result can be: Match/Exact; Match/No-Exact; Tie; No Match. A Tie means that there are multiple possible results for that address.

Tax areas that are incorporated places can overlap counties within the United States. For example City ABC may overlap county 1 and county 2. Each county may impose no transaction tax, the same transaction tax or different transaction taxes. Relying on the city as a location or a proxy point of sale may provide accurate tax rates or inaccurate tax rates.

The present system and method allows a user to stand at a location (such as a well head) and capture the location's geographic coordinates with a GPS enabled device. The geographic coordinate is then geospatially analyzed in a geographic information system to determine if the point is within a transaction tax area or transaction tax areas. The present invention determines if the point is within the legally defined transaction tax area or transaction tax areas.

The present invention will enable a mobile food service vendor to capture the geographic coordinate where the food vending vehicle is located using a GPS enabled device. The consummation of a transaction may not occur at a location contained in a given dataset.

The present invention will allow a user of a mobile app ("mobile software application") to purchase goods and/or services through the mobile app whereby the mobile software application is taxed based upon the location of the mobile device or place of first use of the mobile app, rather than where the mobile device was purchased or originates.

The system and method may consist of a geographic information system, collection of coordinate-based data models or vector data format used for storing geometric location and associated attribute information in the form of a polygon, line or point and a tax area spatial database storage and management system and tax area rate database.

The system and method performs a geospatial process to determine if a geographic coordinate is within a tax area vector data polygon. The system and method may also perform a geospatial process to determine if the geographic coordinate is on a tax area line or a tax point location.

These and other objects of the invention are achieved by providing a method for calculating a transaction tax of a location, the method comprising: capturing geographic coordinate data using a GPS enabled device; determining if the captured geographic coordinate data is within a transaction tax area; and calculating a transaction tax for the captured geographic coordinate data.

In certain embodiments, the step of calculating is related to tax area tax rate tables.

In certain embodiments, the method further comprises storing the captured geographic coordinate.

In certain embodiments, the geographic coordinate data is selected from a group consisting of latitude, longitude, and/or a vertical coordinate.

In certain embodiments, the captured geographic coordinate data is entered into a geographic information system via the internet or another network.

In certain embodiments, the captured geographic coordinate data is a point.

In certain embodiments, the step of determining if the geographic coordinate data is within a transaction tax area occurs by geospatially analyzing the captured geographic coordinate data to determine if the captured geographic coordinate data is within the transaction tax area.

In certain embodiments, the determining step includes utilizing a feature overlay analysis of a coordinate-based data model of a legally defined tax area that represents geometry types for points, lines and polygons and shows the legal boundary of a tax area or tax areas. In certain embodiments, the coordinate-based data model is digital.

In certain embodiments, the determining step includes performing a spatial type relationship function on the captured geographic coordinate data to determine if the geographic coordinate data is within a tax area or tax areas that are in the form of multiple vector data overlays or layers.

In certain embodiments, the determining step involves converting tax area raster data to tax area vector data.

In certain embodiments, the tax area vector data is in the form of a polygon, point or line.

In certain embodiments, the determining step involves performing a spatial type relationship function on the captured geographic coordinate data to a spatial database storage and management system of the tax area or tax areas consisting of the same attribute and geometry and geographic elements in the tax area vector data.

In certain embodiments, the method occurs where a transaction is consummated for the imposition of transaction taxes such as sales tax, use tax, value added tax, goods and services tax or other transactional taxes.

In certain embodiments, the method includes calculating the tax for a point of sale based upon the transaction tax for the captured geographic coordinate data. In certain embodiments, the point of sale is a non-traditional point of sale.

Other objects of the invention are achieved by providing a system for calculating a transaction tax of a captured geographic coordinate data, the system comprising: a memory comprising computer executable instructions and data; and a processor functionally coupled to the memory and configured by the computer executable instructions, the processor able to: receive geographic coordinate data from a GPS enabled device; determine if the captured geographic coordinate data is within a transaction tax area; and calculate a transaction tax for the captured geographic coordinate data.

Other objects of the invention are achieved by providing a non-transitory computer readable storage medium storing a computer program product for calculating a transaction tax of a captured geographic coordinate, the computer program product comprising: computer executable instructions and data, the computer executable instructions able to execute a computer program able to: receive a unknown geographic coordinate from a GPS enabled device; determine if the unknown geographic coordinate is within a transaction tax area; and calculate a transaction tax for the unknown geographic coordinate. In certain embodiments, the unknown geographic coordinate is a geographic coordinate of unknown tax situs.

Other objects of the invention are achieved by providing a mobile device comprising: a memory comprising computer executable instructions and data; and a processor functionally coupled to the memory and configured by the computer-executable instructions, the processor able to: receive an unknown geographic coordinate from a GPS enabled device; determine if the unknown geographic coordinate is within a transaction tax area; and calculate a transaction tax for the unknown geographic coordinate.

Other objects of the invention are achieved by providing a method for calculating a transactional tax of geographic coordinate data, the method comprising: entering geographic coordinate data into a geographic information system; analyzing the geographic coordinate data by utilizing a feature overlay of coordinate-based data models or vector data in the form of a point, line or polygon that graphically shows the legal boundary of a tax area; and performing a spatial type relationship function on the geographic coordinate data to determine if the geographic coordinate data is within the tax area, wherein the spatial type relationship function includes multiple coordinate-based data models or multiple vector data overlays or layers.

In certain embodiments, the method involves returning the rate or rates for all tax areas that the point is within to a mobile device if the geographic coordinate data is within a tax area or tax areas. In certain embodiments, the method queries a tax rate database.

In certain embodiments, the method includes a spatial database storage and management system of the tax area consisting of the same attribute and geographic elements in the tax area vector data.

In certain embodiments, the method is based on coordinate-based data models in the form of vector data in the form of a polygon, point or line.

In certain embodiments, the method uses at least six decimal places for latitude resulting in a horizontal precision of ±1.11 meters or approximately 3.6 foot radius emanating from the geographic coordinate or precision based on current performance levels specified by the GPS SPS.

In certain embodiments, the method uses at least six decimal places for longitude resulting in a horizontal precision of ±0.955 meters or approximately 3.2 foot radius emanating from the geographic coordinate or precision based on current performance levels specified by the GPS SPS.

In certain embodiments, the method utilizes a boundary and survey system to collect information about selected legally defined geographic tax areas so that each tax jurisdiction can update boundary and survey changes based on a legal action by the governing authority.

In certain embodiments, coordinate-based data models and spatial databases for tax jurisdictions are available from national governments, state governments, county, province, region or parish governments, incorporated places such as cities, towns, villages and any other tax area authorized by law. In certain embodiments, raster data for tax jurisdictions is available from national governments, state governments, county, province, region or parish governments, incorporated places such as cities, towns, villages and any other tax area authorized by law.

In certain embodiments, the method involves converting raster data to a coordinate-based data model, and raster data to a spatial database in the geographic information system network.

Other objects of the invention are achieved by providing a system for calculating sales tax of a geographic coordinate data, the system comprising: a memory comprising a sequence of instructions to be performed on spatial data; a memory comprising of stored spatial data; and a memory comprising of captured geographic coordinate data.

Other objects of the invention are achieved by providing a mobile device comprising a global positioning system enabled mobile device of the user that communicates with the spatial database storage and management system through a network.

Other objects of the invention are achieved by providing a computer-implemented method for calculating a transaction tax for a mobile app stored on a mobile device, the method comprising: capturing geographic coordinate data of the location of the mobile device storing the mobile app; determining if the captured geographic coordinate data is within a transaction tax area; and calculating a transaction tax for services and/or products offered by the mobile app based upon the transaction tax area. In certain embodiments, the services and/or products offered are digital.

In certain embodiments, the mobile apps are preloaded onto the mobile devices. In certain embodiments, the mobile apps are in-store purchases of the apps.

In certain embodiments, the transaction tax is calculated solely on the geographic coordinate data and is unrelated to an address associated with the mobile device.

In certain embodiments, the geographic coordinate data involves the location of first use of the mobile device.

In certain embodiments, the method further comprises capturing additional geographic coordinate data during purchase of services and/or products offered by the mobile app.

In certain embodiments, the transaction tax for the services and products purchased is recalculated based upon the additional geographic coordinate data.

In certain embodiments, the additional geographic coordinate data is recalculated on an ongoing basis as the location of the mobile device changes.

In certain embodiments, the method occurs where a transaction is consummated for the imposition of transaction taxes such as sales tax, use tax, value added tax, goods and services tax or other transactional taxes.

In certain embodiments, the geographic coordinate data is selected from a group consisting of latitude, longitude, and/or a vertical coordinate.

In certain embodiments, the step of determining if the geographic coordinate data is within a transaction tax area occurs by geospatially analyzing the captured geographic coordinate data to determine if the captured geographic coordinate data is within the transaction tax area.

In certain embodiments, the determining step includes utilizing a feature overlay analysis of a coordinate-based data model of a legally defined tax area that represents geometry types for points, lines, polygons and represents the legal boundary of a tax area or tax areas.

In certain embodiments, the determining step includes performing a spatial type relationship function on the captured geographic coordinate data to determine if the geographic coordinate data is within a tax area or tax areas that are in the form of multiple vector data overlays or layers.

In certain embodiments, the determining step involves converting tax area raster data to tax area vector data.

In certain embodiments, the tax area vector data is in the form of a polygon, point or line.

In certain embodiments, the determining step involves performing a spatial type relationship function on the captured geographic coordinate data to a spatial database storage and management system of the tax area or tax areas consisting of the same attribute and geometry and geographic elements in the tax area vector data.

Other objects of the invention are achieved by providing a system for calculating a transaction tax for a mobile app stored on a mobile device, the system comprising: a mobile device; and a mobile app stored on the mobile device, wherein the mobile device includes: a memory comprising computer executable instructions and data, and a processor functionally coupled to the memory and configured by the computer executable instructions, the processor able to: capture geographic coordinate data of the location of the mobile device storing the mobile app; determine if the captured geographic coordinate data is within a transaction tax area; and calculate a transaction tax for services and products offered by the mobile app based upon the transaction tax area.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 23 is a screenshot of the Rates menu with rate output for the location input in FIGS. 19 and 20.

DETAILED DESCRIPTION OF THE INVENTION

Figure 1:
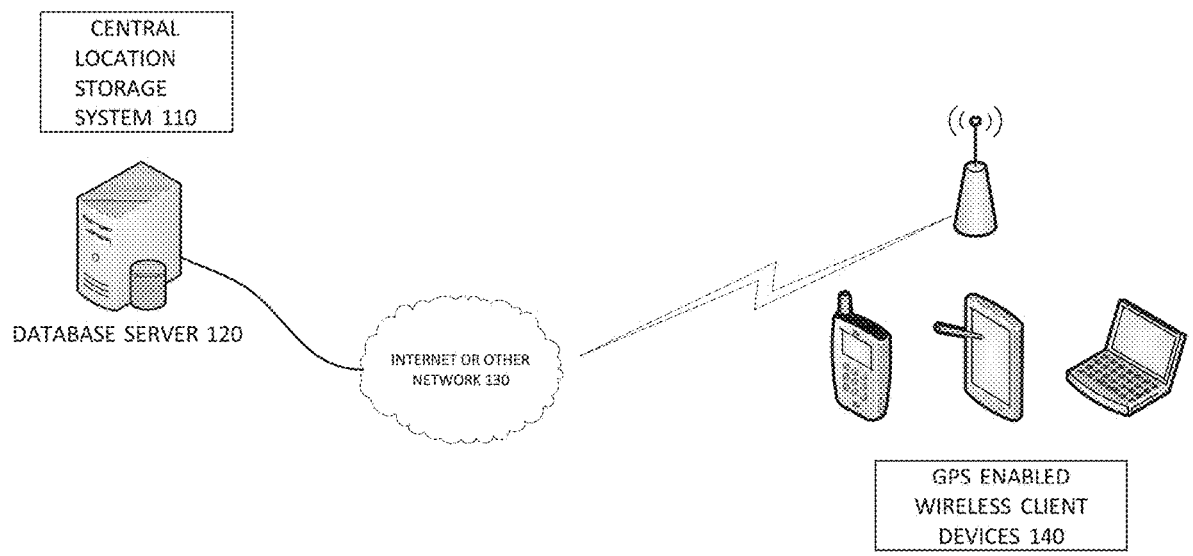
FIG. 1 is a schematic diagram of one embodiment of a system that can be used to practice aspects of the present invention.

In the following description, numerous details are set forth for purpose of explanation. However, one of ordinary skill in the art will realize that the invention may be practiced without the use of these specific details. For instance, the techniques described below are described in a specified order, but other embodiments may change the order of the operations while still embodying the current invention.

The present invention provides a location based system and method for calculating sales and use tax. The present invention provides location based system and method for calculating sales tax for businesses that are not identified by a human readable address.

In the current art, all known geographic point features can be geocoded. Every lake, harbor, address, airport, building, cemetery, church, etc. can be geocoded to estimate the center point of the geographic feature. Geocoding is the process of taking an address and identifying its geographic coordinates. Every known point location can be geocoded to identify its latitude and longitude.

Conventional sales tax solutions are designed to find sales tax rates based on known addresses. Conventional sales and use tax solutions are drive by a human readable address, i.e., street name, address number, direction, zip codes or zip+4 codes or other database of known geographic features such as roads, lakes, addresses, monuments, parks, places, etc.

However, conventional sales tax solutions do not work well for businesses that do not have a physical human readable address, such as an oil well or a gas well. These such businesses can have a non-traditional address or point of sale.

Every oil and gas well has a latitude and longitude. The oil and gas well bore "address" is a geographic coordinate or latitude and longitude.

Current state of the art tax solutions lack the capacity to find a sales tax rate solely based on a geographic coordinate (latitude and longitude and/or depth of a well).

The present invention uses geographical information system of tax area shapefiles, database of sales tax rates and programs that determine if a point is inside a tax area boundary and if so, the present invention determines the sales tax rate of the tax area (polygon).

The present invention is design to provide accurate sales and use tax rates based on geographic coordinates. The present invention provides methods, apparatus, and systems that will locate the correct rate at the click of a mouse button.

Currently, oil and gas operators are responsible for sale or use tax payments. The present invention can be used by operators that perform a reverse audit for any over/under payment of sales or use tax.

The present invention can be used to apply the correct sales or use tax rate at any given point, such as in North America.

In certain embodiments, the invention involves a mobile service and mobile application that is a location based application for obtaining geographic locations for sales tax purposes.

Moreover, the invention further relates to calculating a transactional tax for a mobile app ("mobile software application") whereby the mobile app is taxed based upon the location of the mobile device or place of first use of the mobile app, rather than where the mobile device was purchased or where it originates.

In certain embodiments, the software application captures a geographic coordinate of a mobile GPS enabled device through any GPS system that is processed through a shapefile/geodatabase system to determine tax area(s) for assigning sales or use tax to sales of services or tangible personal property to be used and maintained on the mobile device.

In certain embodiments, a user obtains site location (latitude and longitude) or enters known point (latitude and longitude). In certain embodiments, the point (or processed points) is available for users in various formats. The data is sent to a server that is remote from where the data is collected and is available in various formats.

The server includes a memory and processor to determine the transactional rate of the point.

In certain embodiments, the points are compared to Special purpose tax districts (SPDs). Special purpose tax districts (SPD) are tax political subdivisions of a state. An SPD may or may not be congruent with a state, county or city. An SPD may not conform to a well-known boundary. Examples of SPDs are metro, emergency service, municipal development and stadium districts are an example of an SPD and are usually incongruent with a city or county boundary.

Points that are in the state, county and/or city with incongruent SPDs are processed through Quantum GIS (open source GIS application) and the Open Source MySql database that stores and manages the spatial data is queried to see if the point is within a tax area or outside a tax area.

All points are processed according to tax business rules that are driven by location. All Points are joined with shapefiles with the output being "yes" if in the shape and "no" if outside. Points inside a polygon are related to tax tables based on GEOIDs. GEIODs are identifiers based on geographic location.

In certain embodiments, the points are compared to base map layers and use current US tiger, states, county, and places shape files to determine whether a point is within a certain tax area. In certain embodiments, the base map layers are stored on a server or a computer.

In certain embodiments, these shapes and shape files represent tax jurisdictions that have boundaries that are congruent with a known tax jurisdiction.

Points in counties and cities with incongruent SPDs will be processed through a spatial database to determine if the point is in the incongruent SPD.

In certain embodiments, the present invention relates to the accurate calculation of local sales and use taxes based upon a particular location such as an oil or gas well. Because these wells are rarely assigned human readable addresses (ex. 123 Main Street), the system is designed to calculate the required tax rates using latitude and longitude coordinates, which are acquired by the user through a variety of measures.

Once the coordinates are obtained, they can be processed and stored in a spatial database system that makes the processed data points available to the user in various formats. These location points are compared to a spatial database of special-purpose districts ("SPDs") by county and city. These SPDs are translated into an Interactive Database (GEOID) shape files and compared with the location coordinates acquired by the user through the use of an open source geographic information system (GIS) in a binary manner.

Thus, even when a particular well might be sited in a location where the city and county SPDs are incongruent and/or overlapping, the location coordinate data provided by the user can be used to accurately compute the well's tax rate with a minimum effort, and without the need to manually search through every state and county, or municipal website.

In certain embodiments, a system and method is provided in which a geographic coordinate (such as an unknown geographic coordinate) is captured by a user's GPS enabled device to determine if the geographic coordinate is within a transaction tax area or transaction tax areas.

In certain embodiments, the geographic coordinate is entered into a geographic information system via the internet or other network where the geographic coordinate is geospatially analyzed to determine if the point is within a transaction tax area or transaction tax areas. The system and method analyzes the geographic coordinate by utilizing a feature overlay of vector data in the form of a polygon that graphically shows the legal boundary of a tax area or tax areas. The system and method performs a geospatial process on the geographic coordinate to determine if the geographic coordinate is within a tax area or tax areas that are in the form of multiple vector data overlays or layers.

In certain embodiments, the system and method has a geodatabase of the tax area or tax areas consisting of the same attribute and geographic elements in the tax area vector data. The system and method can alternatively perform a geospatial process on the geodatabase data to determine if the geographic coordinate is within a tax area or tax areas. The system has application for determining if the point of sales is located within a tax area or tax areas. The system is based on vector data in the form of a polygon, point or line.

This process occurs where a transaction is consummated for the imposition of transaction taxes such as sales tax, use tax, value added tax, goods and services tax or other transactional taxes.

The sourcing of software is dependent on state law. Many states have enacted laws define the sourcing of software is used or first used. Sales are sourced where the software or application is used. Some states source the sales or use tax to the location of the remote server if the software is not actually downloaded.

A concurrent issue is nexus. States are enacting remote seller laws to capture a use tax on sales that occur within the state boundaries but made by an out-of-state seller.

The present invention provides a system and method that allows sellers of mobile software applications to obtain the sales or use tax rates for the location of the mobile device so that sales or use taxes can be collected where the first use of the mobile application occurs.

The present invention is used to collect taxes on remote sales, like where a sale is made over the internet or via a mobile app to a vendor who does not have a physical presence in the purchaser's location.

Many states currently tax sales of software. If the delivery is to a desktop the sales tax situs is easy to obtain because usually the desktop is at a fixed location with an address. Many states' definition of a sale occurs at the place where the product/service was first used if the location is known. So if the vendor does not know the place of first use the sales tax rate defaults to the address of the account holder.

The present invention is a solution to this problem and correctly identifies a place of first use based solely on geographic location and unrelated to an address of the account holder.

For example, if a user purchases a mobile app for a phone in Louisiana then that is where the app is first used and thus a sales tax should be collected at that point in Louisiana (even though the user may live in Texas and the user's mobile account has a Texas address).

Five states have enacted new sales tax laws that include a new definition of nexus: economic presence. The present invention captures the transactional tax based upon the economic presence of a user.

Furthermore, the present method and system would capture where the device is and process sales tax for services/products delivered to a mobile device. Some states define software as a service whereas some states define software as a product or tangible personal property.

A system and method is also provided in which a known geographic coordinate is entered into a geographic information system via a network such as the internet. The system and method analyzes the geographic coordinate by utilizing a feature overlay of vector data in the form of a polygon that graphically shows the legal boundary of a tax area or tax areas. The system and method performs a geospatial process on the geographic coordinate to determine if the geographic coordinate is within a tax area or tax areas that are in the form of multiple vector data overlays or layers. The system and method has a geodatabase of the tax area or tax areas consisting of the same attribute and geographic elements in the tax area vector data. The system and method alternatively perform a geospatial process on the geodatabase data to determine if the geographic coordinate is within a tax area or tax areas. This process occurs where a transaction is consummated for transaction taxes such sales tax, use tax, value added tax, goods and services tax or other transactional taxes.

The system and method is based on vector data in the form of a polygon, point or line. The system uses the North American Datum of 1983(NAD83) is used for all latitude and longitude measurements. (Note that NAD83 is identical to WGS84 datum within the conterminous United States.). The system processes horizontal positions in latitude and longitude coordinates. The format is in decimal degrees carried out to at least 6 decimal places. A point on the earth's surface is established by the Global Positioning System abbreviated as "GPS". The GPS is a constellation of earth-orbiting, Department of Defense satellites transmitting radio signals to users. The United States Air Force[1] develops, maintains, and operates the space and control segments. Horizontal position accuracy for the GPS SPS (standard positioning system) for the first quarter of 2014 reports that the GPS SPS receivers provided better than 3 meter horizontal accuracy.[2] The WAAS PAN (Wide Area Augmentation System Performance Analysis Report) for the reporting period Jan. 1 to Mar. 31, 2014 reports better than ±1 meter horizontal accuracy.[3]

[1] www.gps.gov
[2] www.ntsb.tc.faa.giv GPS SPS (performance analysis report) for the reporting period Jan. 1-31 Mar. 2014.
[3] www.ntsb.tc.faa.gov WAAS SPS (performance analysis report) for the reporting period Jan. 1-31 Mar. 2014.

Geographic coordinates are in the format of decimal degrees. Decimal degrees precision can vary based on the number of places after the decimal. The two charts[4] below illustrates the level of precision with each decimal place for latitude and longitude

[4] Texas Commission of Environmental Quality referencing Robinson, Arthur H. et al. *Elements of Cartography*, 5th ed. New York: John Wiley & Sons, 1984. (pp 64-66, Appendix B)

Using the figures for 31 degrees North latitude, it is possible to construct the following table:

| 1 degree of latitude | 1.000000 degree r | 110,874.40 meters |
|---|---|---|
| 1/10 of a degree of latitude | 0.100000 degree r | 11,087.44 meters |
| 1/100 of a degree of latitude | 0.010000 degree r | 1,108.74 meters |

| 1/1000 of a degree of latitude | 0.001000 degree r | 110.87 meters |
|---|---|---|
| 1/10000 of a degree of latitude | 0.000100 degree r | 11.09 meters |
| 1/100000 of a degree of latitude | 0.000010 degree r | 1.11 meters |
| 1/1000000 of a degree of latitude | 0.000001 degree r | .11 meters |

Using the figures for 31 degrees North latitude, it is possible to construct the following table:

| 1 degree of longitude | 1.000000 degree r | 95,506 meters |
|---|---|---|
| 1/10 of a degree of longitude | 0.100000 degree r | 9,550.6 meters |
| 1/100 of a degree of longitude | 0.010000 degree r | 955.06 meters |
| 1/1000 of a degree of longitude | 0.001000 degree r | 95.506 meters |
| 1/10000 of a degree of longitude | 0.000100 degree r | 9.551 meters |
| 1/100000 of a degree of longitude | 0.000010 degree r | .955 meters |
| 1/1000000 of a degree of longitude | 0.000001 degree r | .096 meters |

In certain embodiments, the invention is designed to use at least six decimal places for latitude resulting in a horizontal precision of ±1.11 meters or approximately 3.6 foot radius emanating from the geographic coordinate or precision based on current performance levels specified by the GPS SPS.

In certain embodiments, the invention is designed to use at least six decimal places for longitude resulting in a horizontal precision of ±0.955 meters or approximately 3.2 foot radius emanating from the geographic coordinate or precision based on current performance levels specified by the GPS SPS.

In certain embodiments, the system and method also utilizes a boundary and survey system to collect information about selected legally defined geographic tax areas so that each tax jurisdiction can update boundary and survey changes based on a legal action by the governing authority. Contemplated boundary and survey changes include authorized new incorporations, annexation, deannexations and boundary corrections. Changes to a legally defined tax area are supported by the legal action taken by the tax entity. This aspect does not contemplate changes to legal boundaries of tax areas that are adjacent to other legally defined tax areas unless there is a written agreement between the two adjacent tax areas that document the correct location of the boundary.

In certain embodiments, shapefile spatial data and geodatabase data for tax jurisdictions is available from national governments, state governments, county, province, region or parish governments, incorporated places such as cities, towns, villages and any other tax area authorized by law.

In certain embodiments, special purpose district tax areas are not congruent to a known legally defined tax area are available as vector data or raster data from the tax authority as public information. Raster data can be converted to vector data and a geodatabase in the geographic information system.

Census Bureau addresses were created to manage the Census Bureau's mail delivery and return operations. The Census Bureau relies upon a Master Address File (MAF) that was derived from postal service addresses. Postal addresses do not specify geographic locations precisely enough to fulfill Census Bureau's constitutional mandate. An address is not a position in a grid coordinate system; it is only a position in a series of ill-defined positions along a route. The location of an address is often ambiguous because street names are not unique, numbering schemes are inconsistent and because routes have two sides-left and right.

In certain embodiments, the system includes a method of finding a point inside a polygon and determining if that point is inside or outside the polygon (actually if the point is on the boundary line it is considered inside). There is no hierarchy of tax jurisdictions. There are no unmapped locations.

In certain embodiments, the system is based the user standing on the ground and fixing the geographic point and then that point is processed through a system of geographic files called shapefiles to determine if that point is inside any shapefile. If the point is inside the shapefile, then the point is inside the boundaries of a sales tax jurisdiction.

The user can also enter any geographic coordinates and the system will process that point as either in a sales tax boundary or outside a sales tax boundary. There are no unmapped locations.

In certain embodiments sales and tax rates are validated by two methods: the Centroid method and the Random point method.

Centroid Method

The centroid method is used to confirm that the sum of all tax areas that a centroid intersects is equal to sum of tax rates enacted by a taxing authority.

A geographic information system will create a centroid for a tax area. A centroid point is the geometric center of a two-dimensional area. Each centroid is geospatially processed in the system to determine which sales tax areas the centroid intersects. The application will process all centroids within a selected area type by state. For example, selecting New York County Centroid validation will return the sales and use tax rates for all 62 counties and/or boroughs.

State centroid processing will return the state rate for each state's centroid. County centroid processing will return a state rate and county rate for each county's centroid. City centroid processing will return a state rate, county rate and city rate for each city's centroid. Special purpose district centroid processing will return a state rate, county rate, city rate if applicable and special purpose district rate for each county's special purpose districts.

For example Utah county centroids for Utah will return the state rate and county rate at each county's centroid. The processed data is contained in a read only electronic spreadsheet. The sales tax rates are then compared with the legally enacted rates. Rate corrections are made within the tax rate database.

Random Point Method

The random point method is used to verify consistency of tax rates for any given point within a tax area. A geographic information system will create a set of random points within a tax area. The random point method demonstrates that random points will produce the same rate within a tax area. The random point method demonstrates that the geospatial processing of a point within a tax area returns consistent tax rates. For example, a point near the border must have the same rate as a point in the center. A point in the northeast must have the same rate as a point in the southeast. The points are geospatially processed to determine if all points produce the same sales tax rate in the tax area.

Figure 24:
FIG. 24 is a screenshot of a database of user defined locations.
Figure 25:
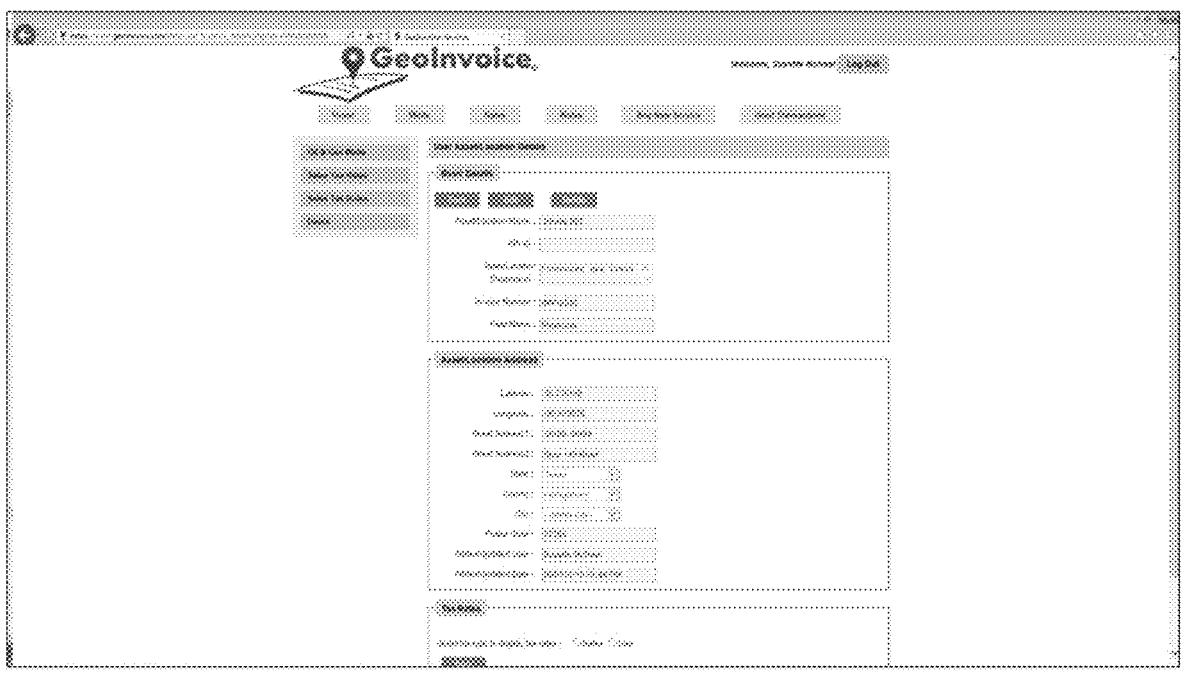
FIG. 25 is a screenshot of the details of the user defined location in FIGS. 21 and 23.

This is shown in FIG. 24 and FIG. 25 whereby the Random Point validation method is shown both in a county map and an SPD respectively.

Referring to FIG. 1, FIG. 1 shows a schematic diagram of one embodiment of a system that can be used to practice aspects of the present invention. The schematic shows a central location storage system 110 and database server 120, which are connected to GPS wireless client devices 140 via the internet or other network 130. In this manner, GPS wireless client devices 140 can communicate with the database server 120 via the internet or other network 130. This allows a wireless client to be located remote from the server, such that the wireless client can be located at an oil well while the server is located hundreds of miles away from the wireless client.

Figure 2:
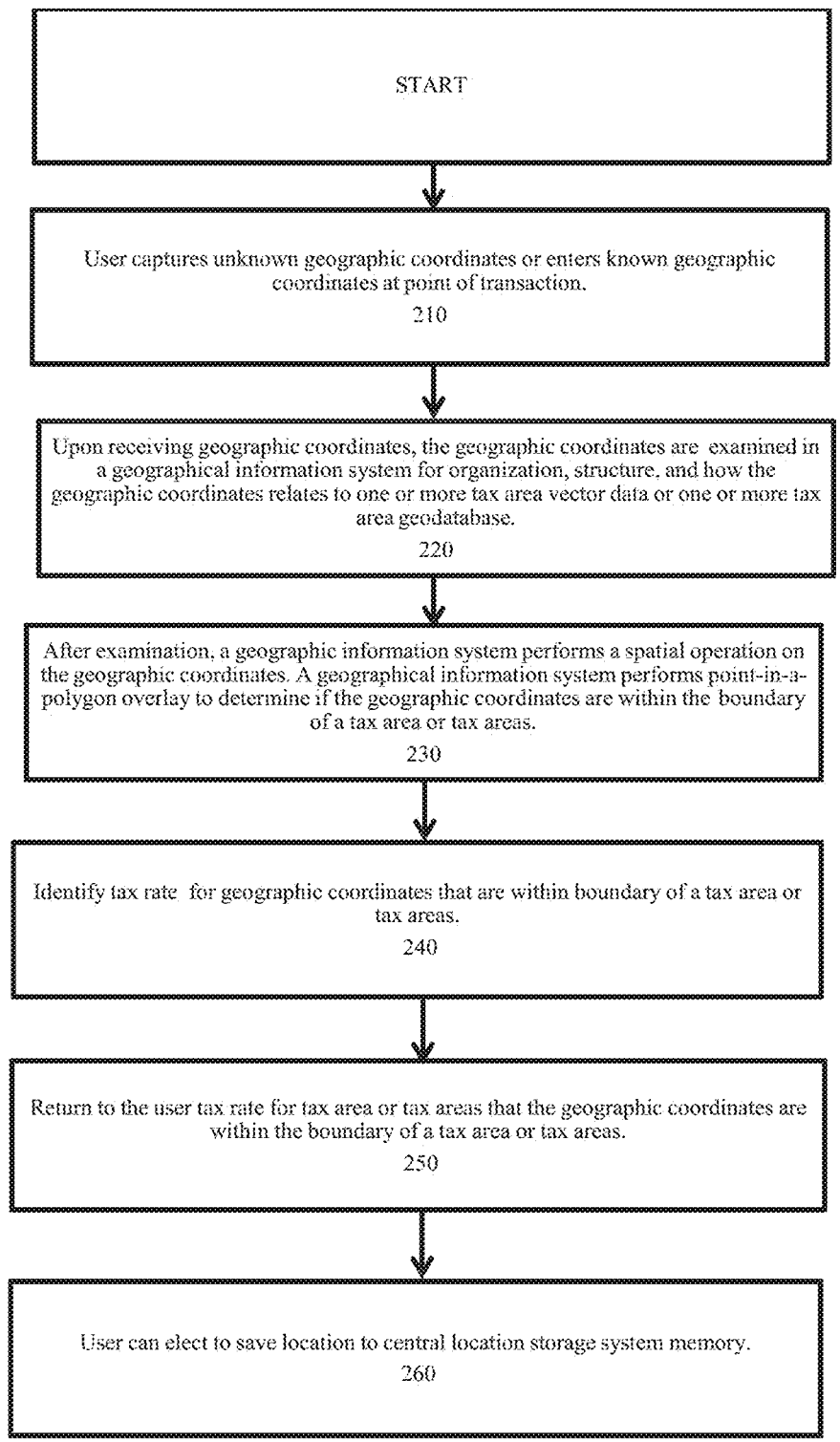
FIG. 2 is a flowchart that illustrates a method for enabling a user to capture an unknown location, process the location in a geographic information system to determine the transaction tax area or transaction tax areas that the geographic coordinate is within and return the transaction tax rate or transaction tax rates to the user's mobile device.

FIG. 2 is a flowchart of an embodiment of the present invention. FIG. 2 shows method step 210 whereby a user captures a geographic coordinate or enters a geographic coordinate at a point of transaction. The geographic coordinate may be known or unknown.

Step 220 involves examining the geographic coordinate. In certain embodiments, the geographic coordinates are examined in a graphical information system for organization, structure, and how the geographic coordinates relate to one or more tax area vector data or one or more tax area databases.

Step 230 involves performing a spatial operation on the geographic coordinates. In certain embodiments, a geographical information system performs point-in-a-polygon overlay to determine if the geographic coordinates are within the boundary of a tax area or tax area. Here, the step, which can occur via a computer processor or on a memory uses a SQL function to determine if a point is within a polygon of a specific tax area.

In certain embodiments, the step involves triangulating the coordinate via an algorithm to determine the tax rate. In certain embodiments, the algorithm involves using three data points, or more than three data points to triangulate the coordinate.

Step 240 involves the identification of the tax rate for geographic coordinates that are within the boundary of a tax area or tax areas.

Step 250 involves returning to a user or returning to a program the tax rate for a tax area of tax areas that the geographic coordinates are within the boundary of a tax area or tax areas.

Step 260 involves having a user elect to save the location to a central location storage system memory.

Figure 3:
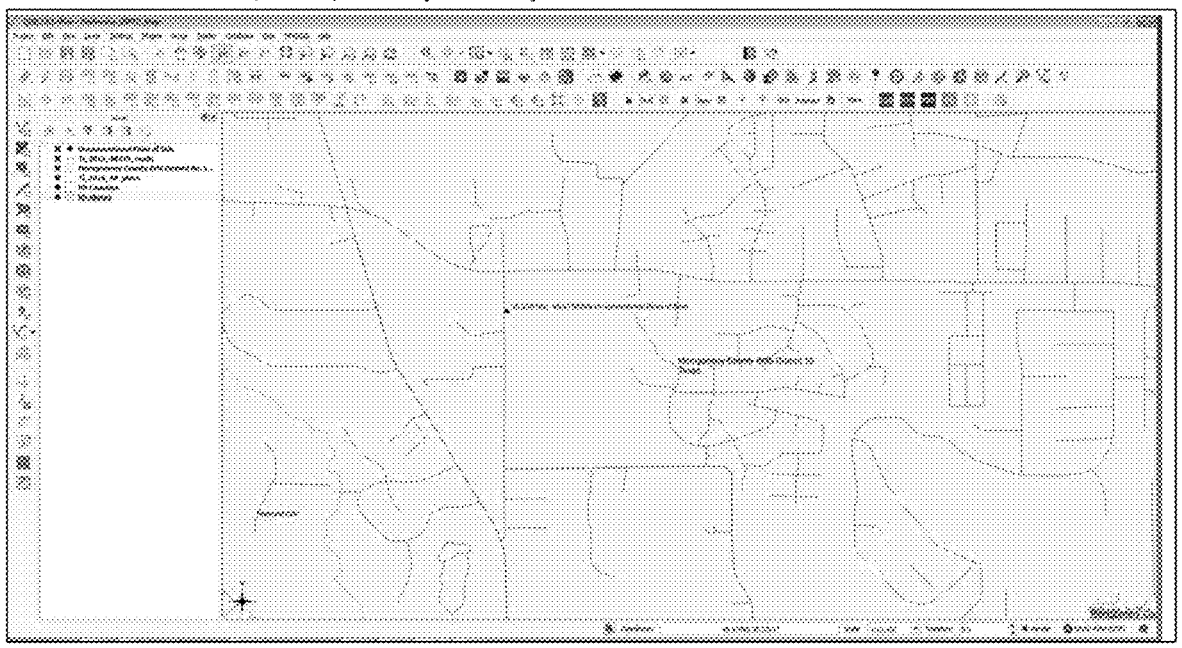
FIG. 3 is a screenshot of tax area number 10 in vector data format.

FIG. 3 is a screenshot of tax area number 9 in vector data format. FIG. 3 involves a dashboard and graphical user interface ("GUI") whereby a map is shown and unknown locations are plotted on the map. A user can use the map to determine locations on a map and to find locations on the map.

Figure 4:
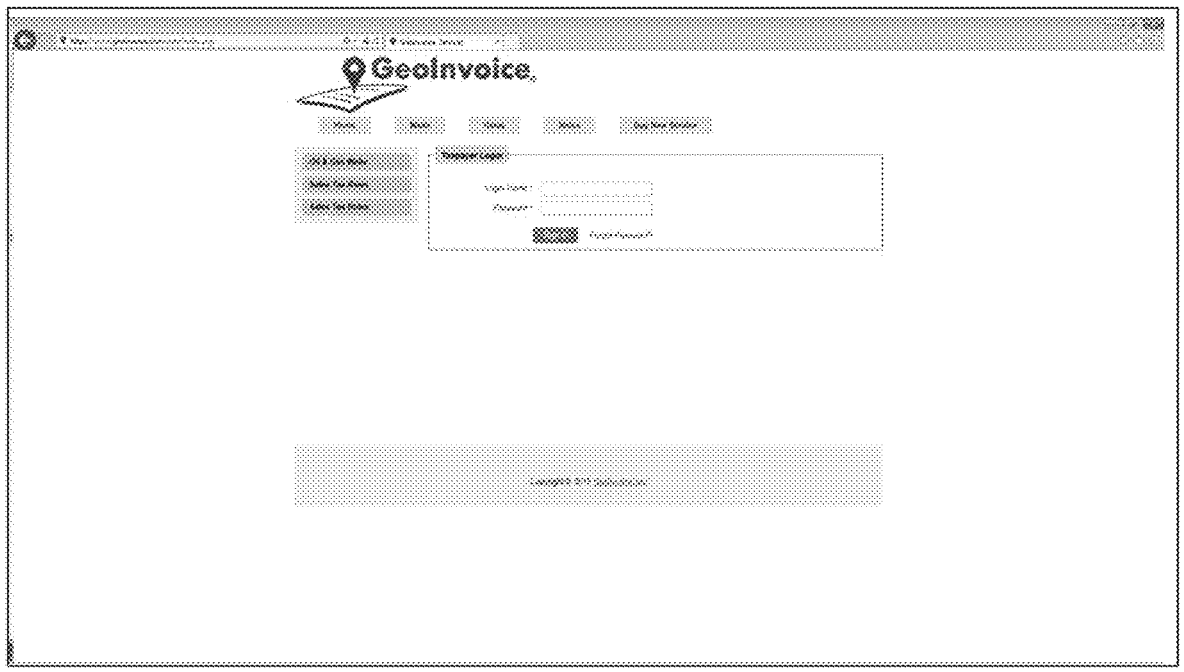
FIG. 4 is a screenshot of the application on a local machine user login.

FIG. 4 is a screenshot of tax area number 9 with nodes. Here, various points are shown, whereby the tax rates of these points can be calculated. FIG. 4 shows various nodes and the nodes can be color coordinated based on the tax rate to provide a visual view of the tax rates on the map.

Figure 5:
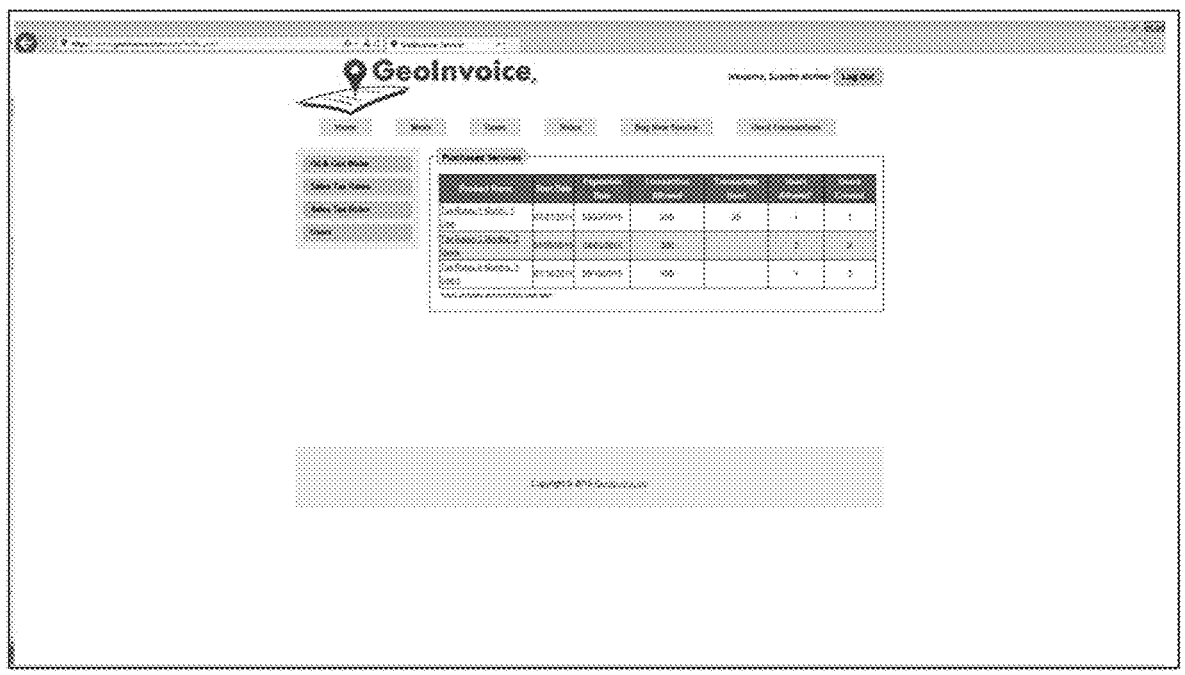
FIG. 5 is a screenshot of purchases services

FIG. 5 is a screenshot of basic statistics about tax area number 9 including 3,984 nodes or 3,984 separate edges or boundary lines. FIG. 5 allows for an input vector layer to be entered and a target field to be shown. Various parameters can be entered such that the nodes. Specifically, the target field can be entered and various parameters can be used. Furthermore, various algorithms can be used that are tied to input from the fields.

Figure 6:
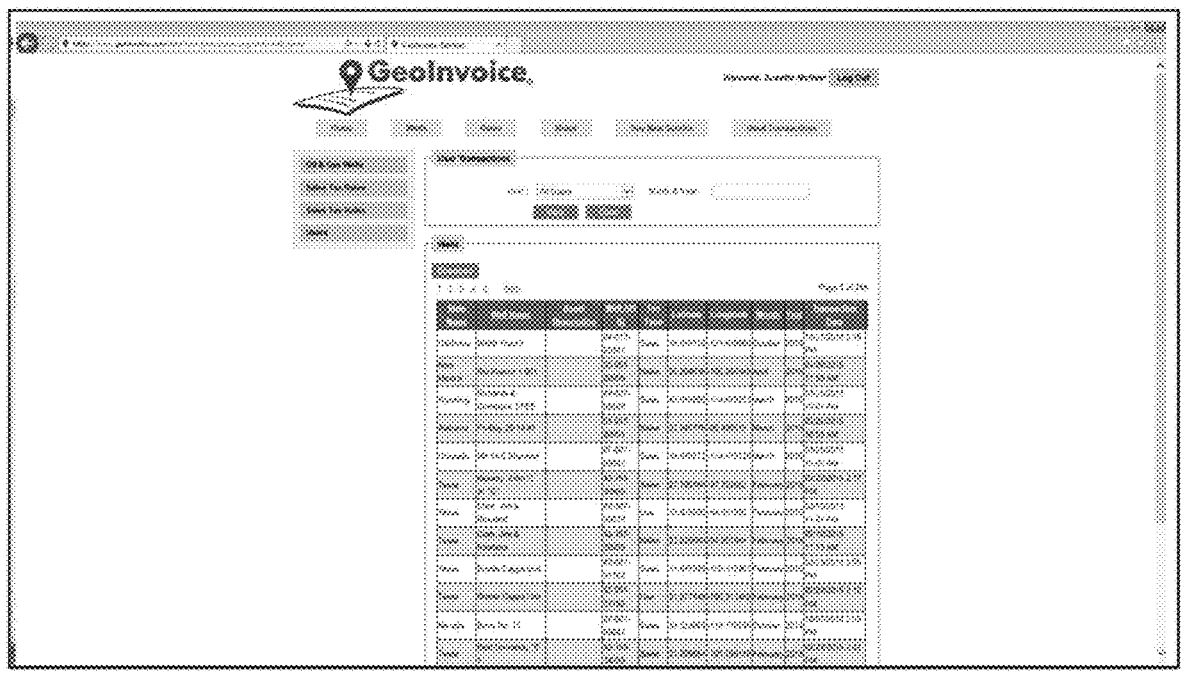
FIG. 6 is a screenshot of a table of saved known locations.

FIG. 6 is a screenshot of tax area number 9 with three unknown locations 001, 002 and 003. It is an object of the invention to calculate the tax transaction rates for these unknown locations. FIG. 6 shows a map of Harris County EMS District 9 and Houston City.

Figure 7:
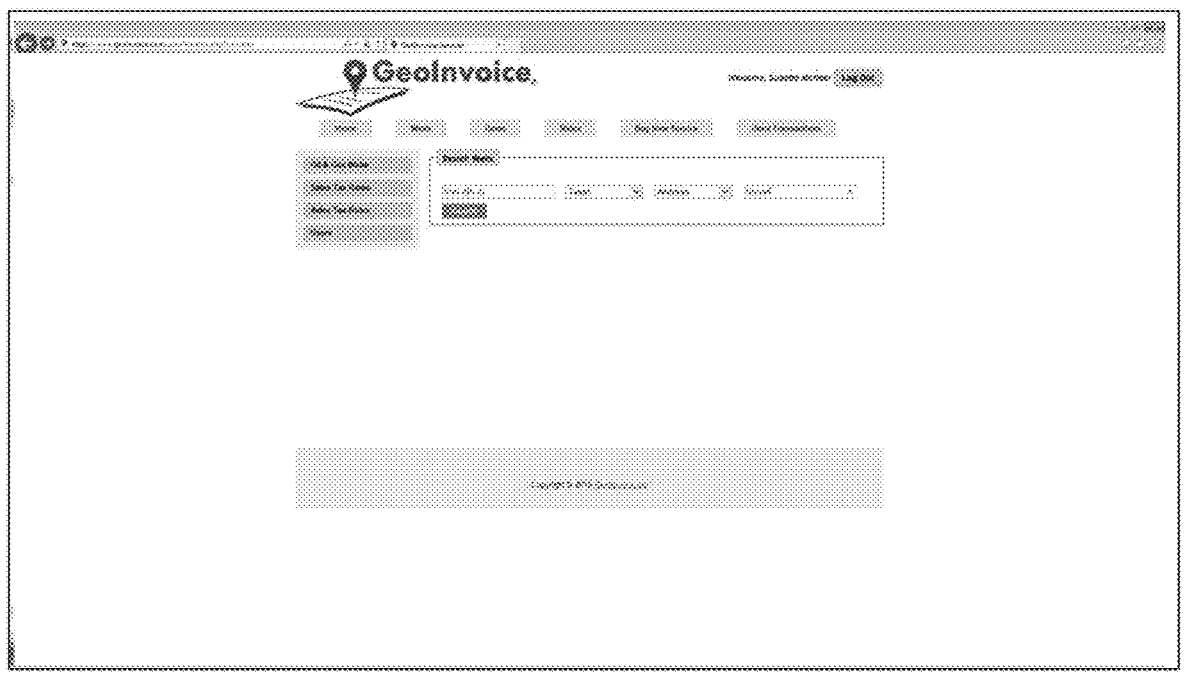
FIG. 7 is a screenshot of a text search a well location.
Figure 8:
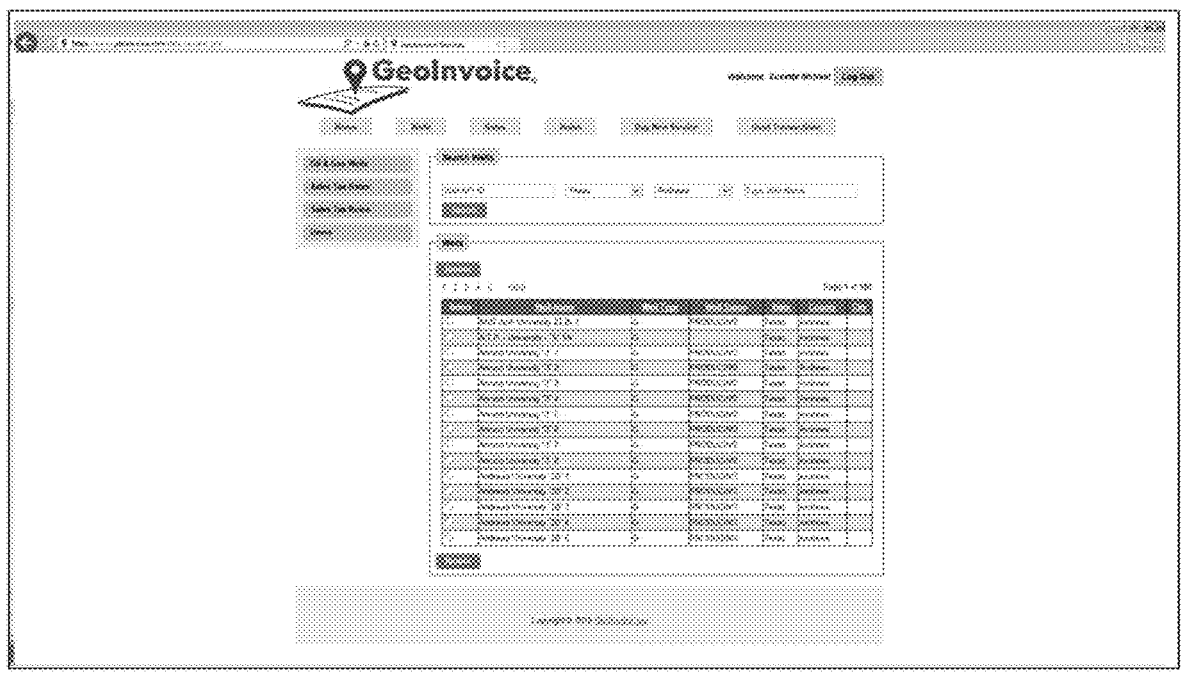
FIG. 8 is a screenshot of the results of a partial text search.
Figure 9:
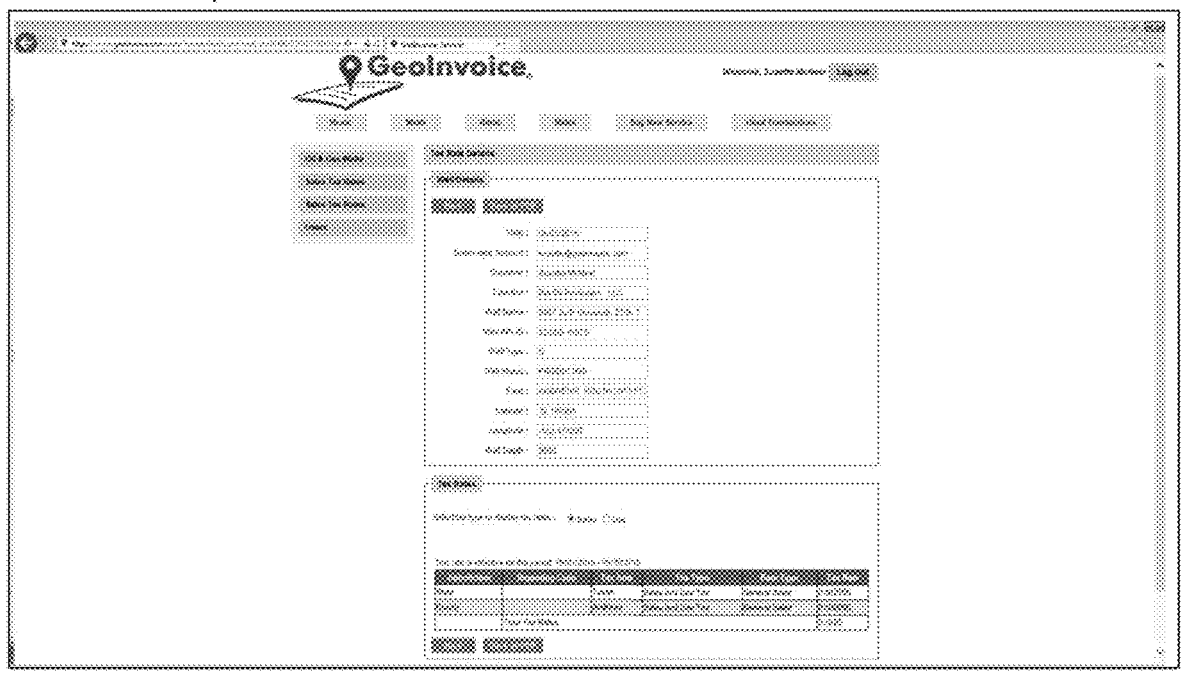
FIG. 9 is a screenshot of the sales tax rate for a well location.

FIG. 7 is a screenshot of a GUI interface on a local machine user login. The interface has a control that allows a user to sign into the computer application. FIG. 8 is a screenshot of the tax rate menu after login on a user's local machine. FIG. 9 is a screenshot of a table of saved known locations.

Figure 10:
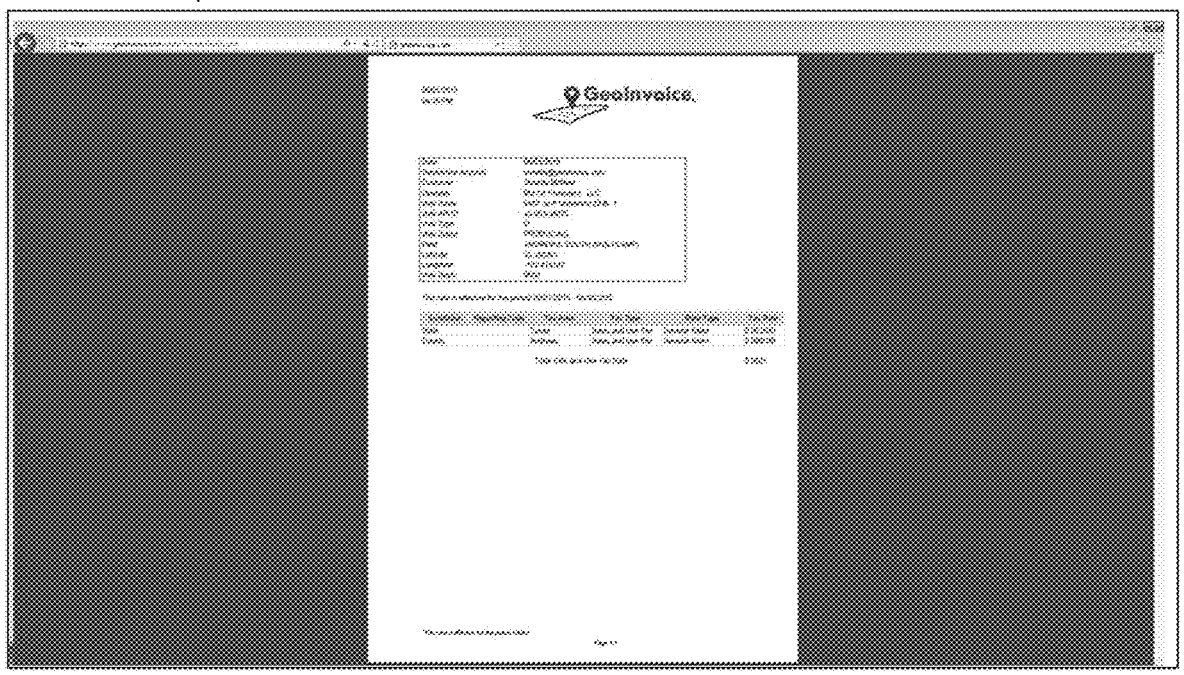
FIG. 10 is a screenshot of a portable document of the tax details for a well location.
Figure 11:
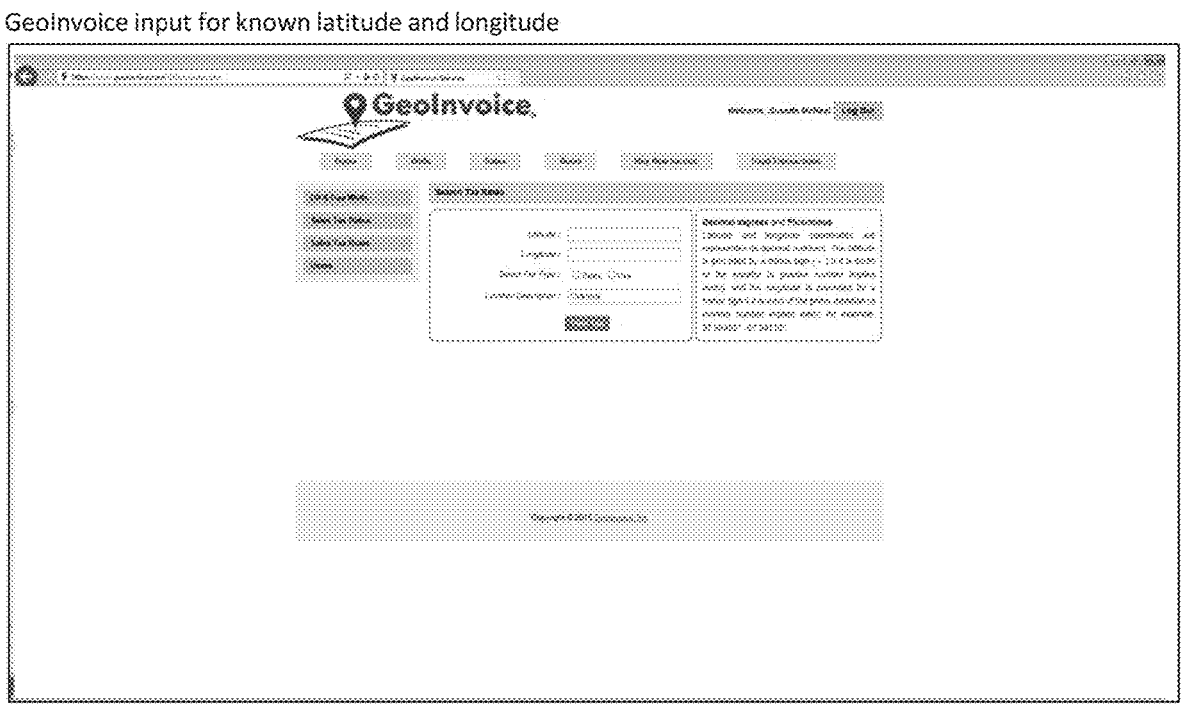
FIG. 11 is a screenshot of the input screen for entering a known latitude and longitude.

FIG. 10 is a screenshot of a radio button selection of a saved location. FIG. 11 is a screenshot of the results of a selection by the user. FIG. 11 shows the date, account, customer, operator, well name, well API, ID, well type, well status, field, latitude, longitude and well depth. FIG. 11 also shows allows a user to select the tax type to be displayed (sales or use).

FIG. 11 includes a dashboard and window and allows a user to enter the appropriate information into the window.

The location of the well can then be saved in the memory or non-transitory storage medium.

Figure 12:
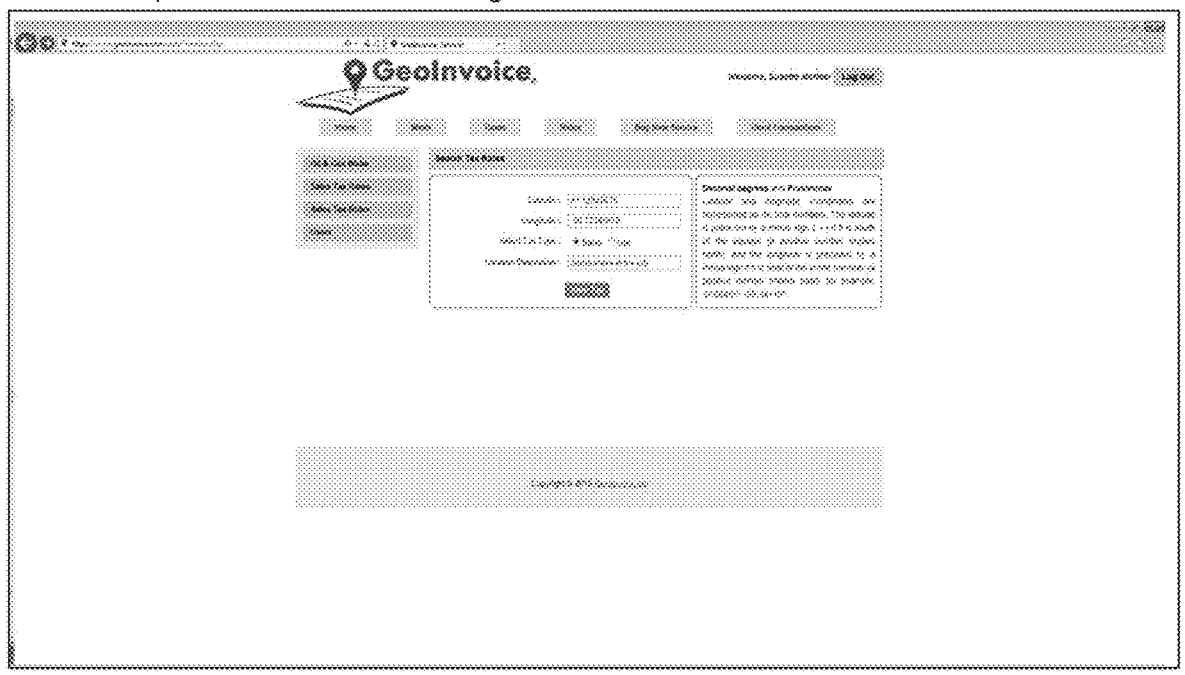
FIG. 12 is a screenshot of the entry of a known latitude and longitude.

FIG. 12 is a screenshot of the sales tax rate for the saved location. FIG. 12 shows the sales tax rate for the state (Texas) as well as the County (Midland) of the location.

Figure 13:
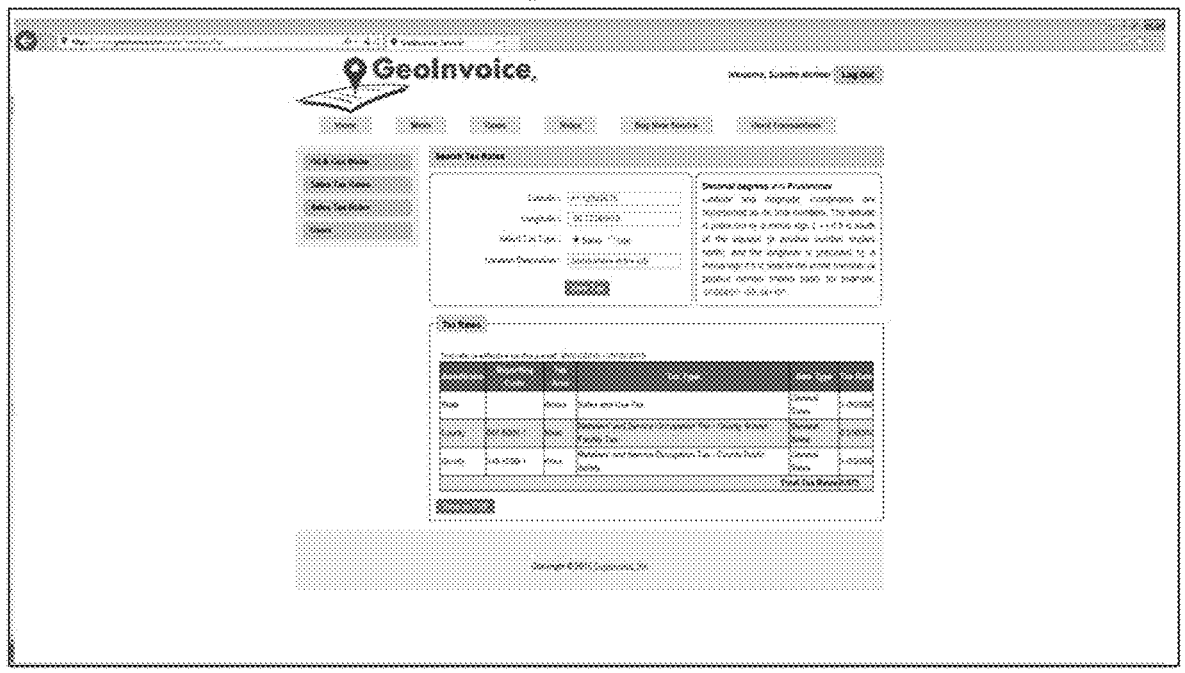
FIG. 13 is a screenshot of the output for the known latitude and longitude entered in FIG. 12.

FIG. 13 is a screenshot of a portable document of the tax details for a saved location. The sales tax for the state and county can be converted to a .pdf or other type of readable document. The document can then exported to a spreadsheet or able to be manipulated by the user.

Figure 14:
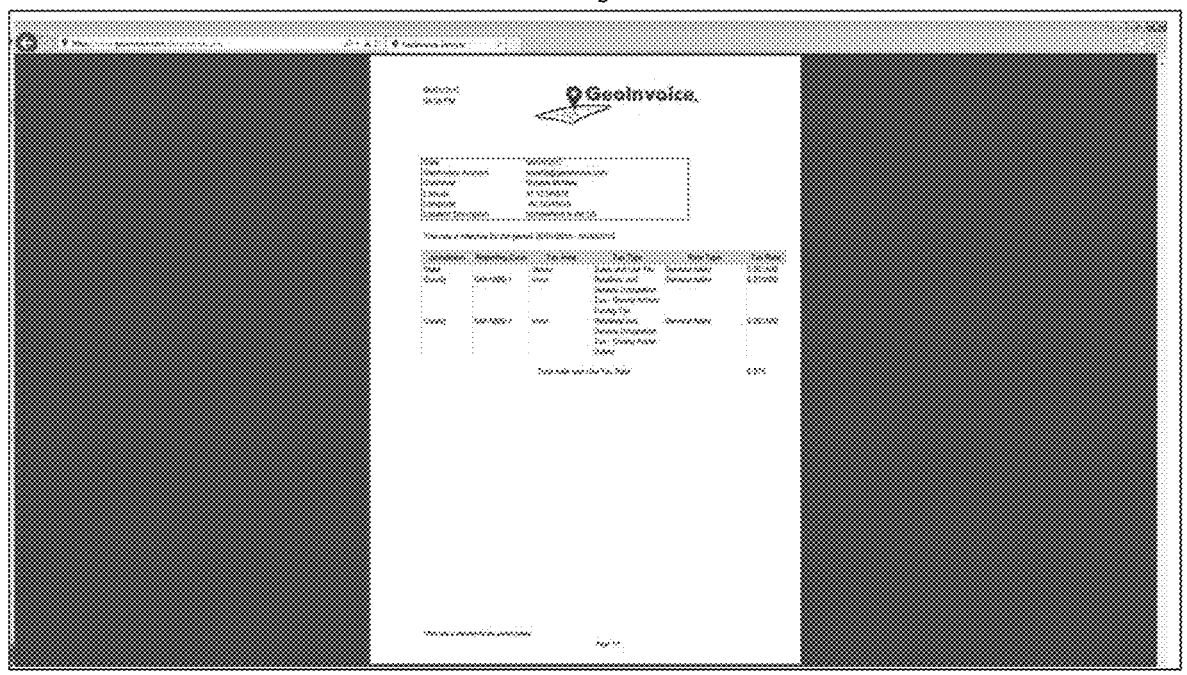
FIG. 14 is a screenshot of a portable document of the tax details for the known latitude and longitude entered in FIG. 12.

FIG. 14 is a screenshot of the input screen for entering a known latitude and longitude. FIG. 14 provides a decimal degrees and plus/minus for the latitude and longitude of the location.

Figure 15:
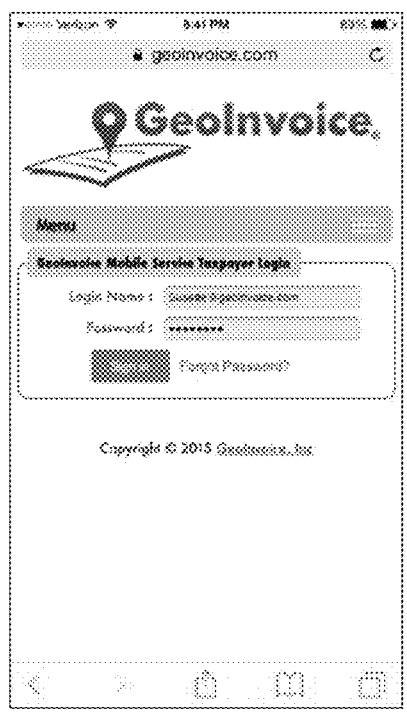
FIG. 15 is a screenshot of the user login for the mobile service.

FIG. 15 is a screenshot of the entry of a known latitude and longitude. FIG. 15 allows a user to input a location description to provide an identifier for the location.

Figure 16:
FIG. 16 is a screenshot of the contact page for the mobile service.

FIG. 16 is a screenshot of the output for the known latitude and longitude entered in FIG. 15. FIG. 16 also shows various tax rates for various types of taxes such as short term rental tax, state manufacturing tax, state electricity manufacturing tax as well as other types of taxes.

Figure 17:
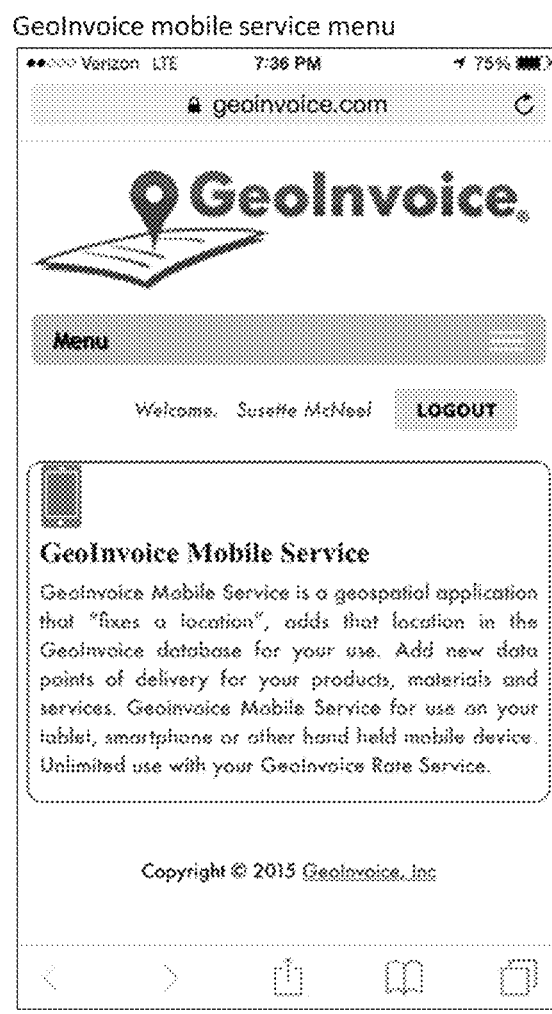
FIG. 17 is a screenshot of the home page for the mobile service after user login.

FIG. 17 is a screenshot of a portable document of the tax details for the known latitude and longitude entered in FIG. 15. FIG. 17 is a document that can be converted to .pdf or exported to a spreadsheet or other user-friendly format.

Figure 18:
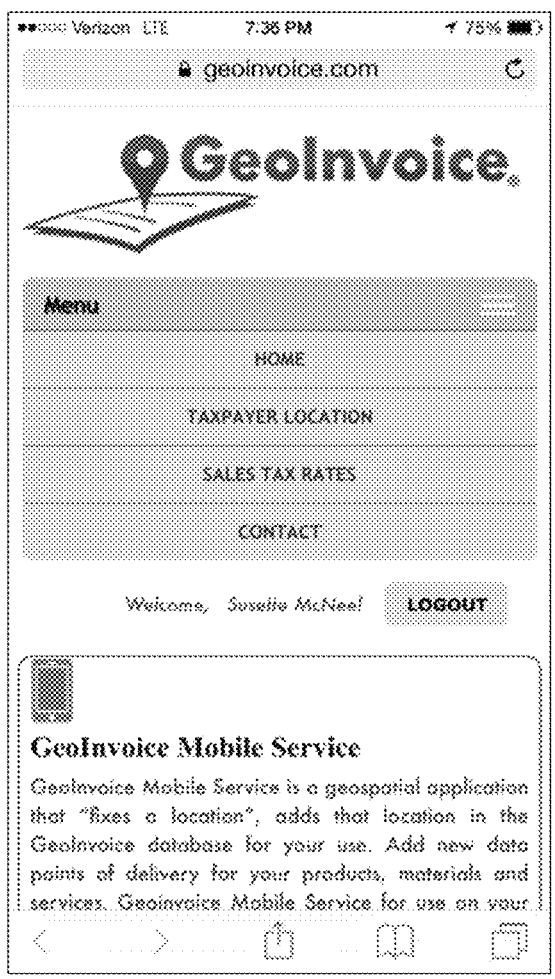
FIG. 18 is a screenshot of the menu page.

FIG. 18 is a screenshot of the user login for the mobile service. This mobile service can be used in a mobile device and is the login for a mobile application.

Figure 19:
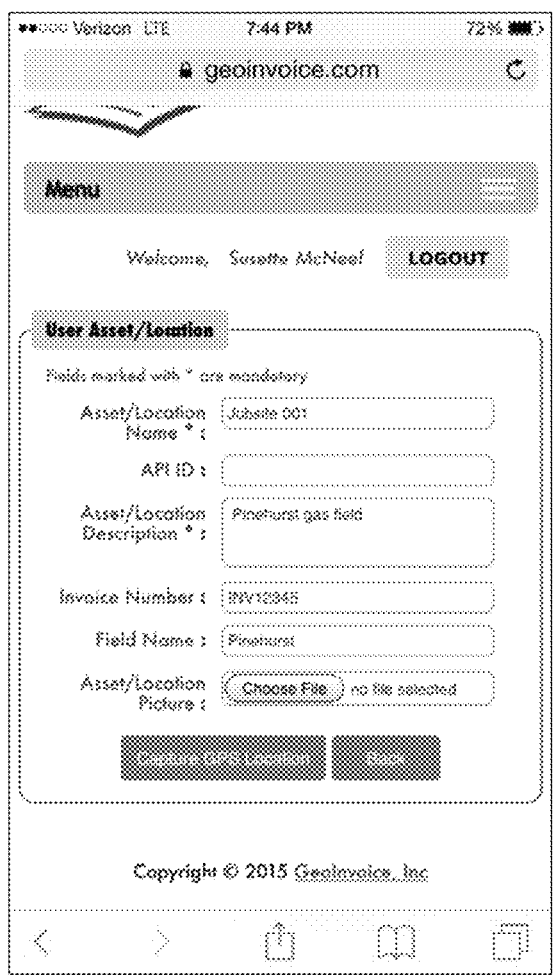
FIG. 19 is a screenshot of the user defined location details.
Figure 20:
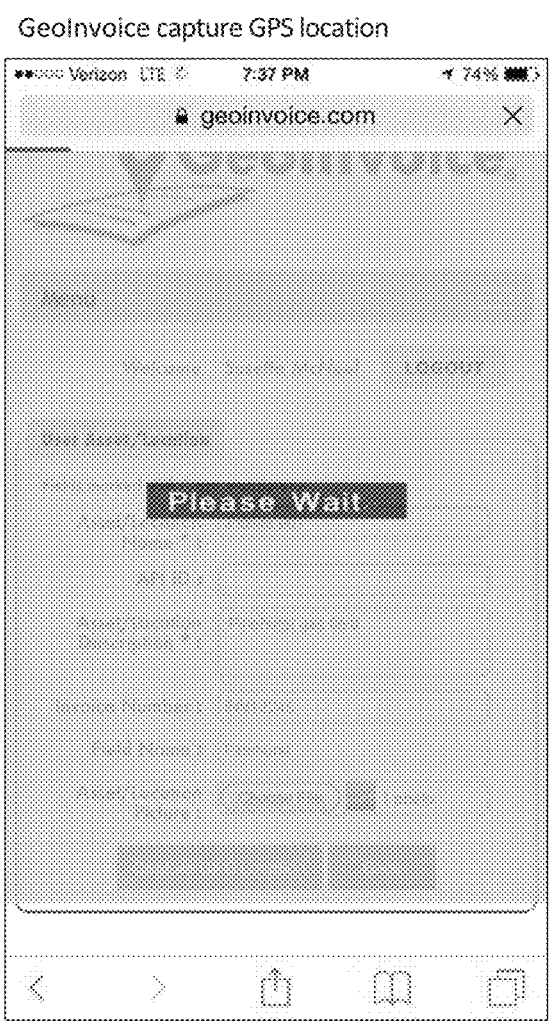
FIG. 20 is a screenshot of capturing the user defined location geographic coordinates.
Figure 21:
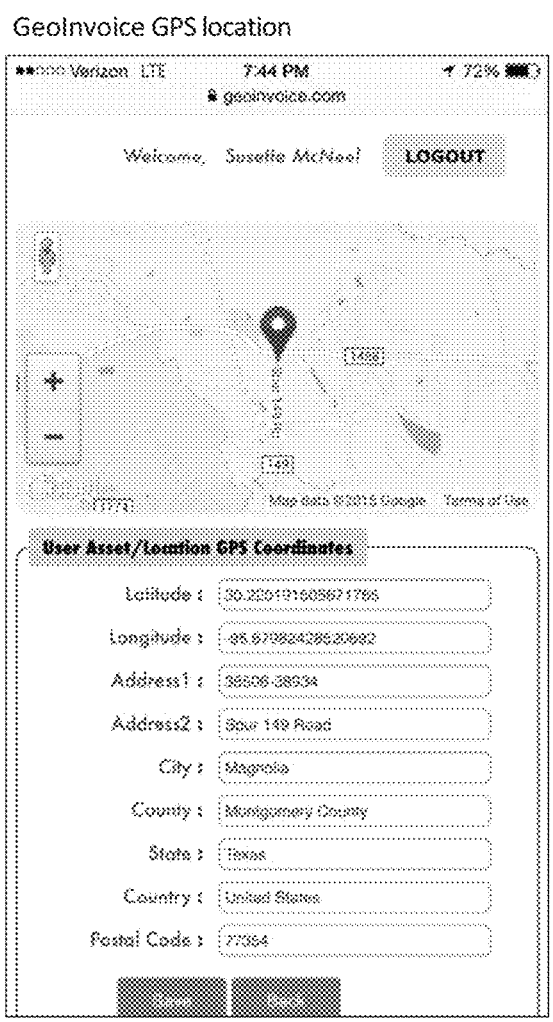
FIG. 21 is a screenshot of the user defined location and map of a location with the option to save as a known location.

FIG. 19 is a screenshot of the contact page for the mobile service. FIG. 20 is a screenshot of the home page for the mobile service after user login. FIG. 21 is the location input screen for saving a location. FIG. 21 allows a user to input well name, API ID, Well Type, Well Status, Field Name and Well Picture among other fields.

Figure 22:
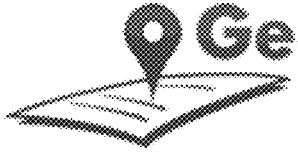
FIG. 22 is a screenshot of the user defined location's geographic coordinates.

FIG. 22 is a screenshot of the location details and map of a location with the option to save as a known location. FIG. 22 provides various relevant details to the well that is relevant to the user.

FIG. 23 is a screenshot of the Rates menu with rate output for the location input in FIGS. 21 and 22.

FIG. 24 is a screenshot of a database of user defined locations.

FIG. 25 is a screenshot of the details of the user defined location in FIGS. 21 and 23.

Figure 26:
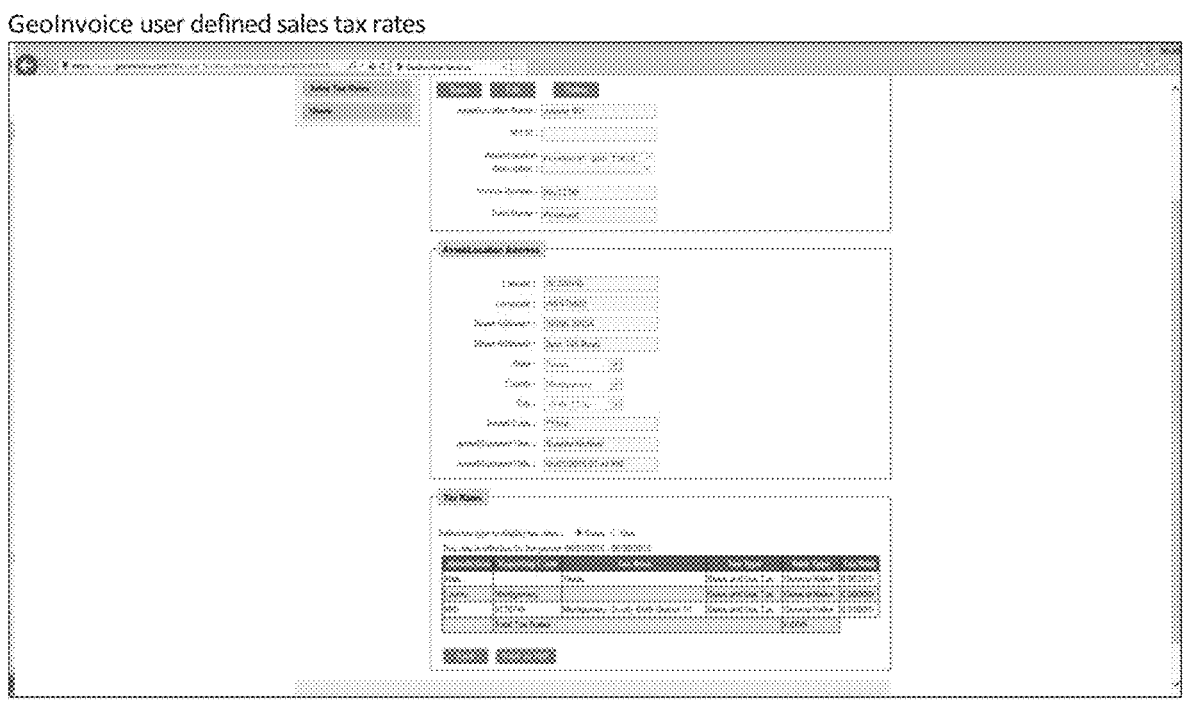
FIG. 26. is a screenshot of the Rates menu for the user defined location with rate output.

FIG. 26. is a screenshot of the Rates menu for the user defined location with rate output.

Figure 27:
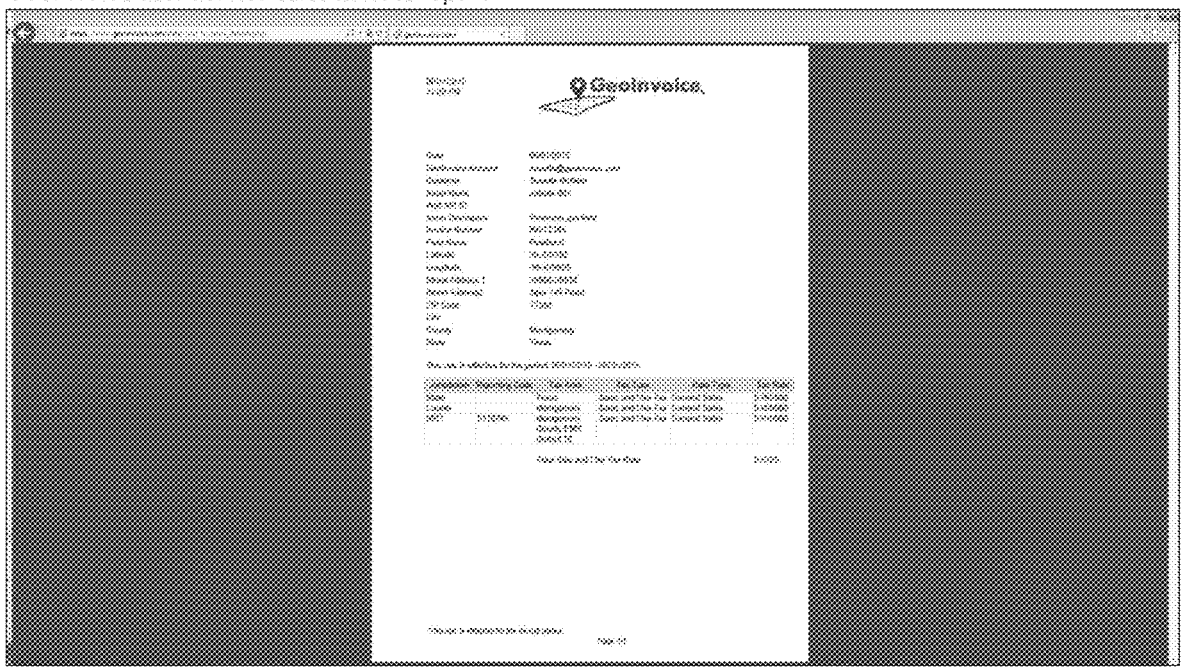
FIG. 27 is a screenshot of portable document of tax details for a user defined location.

FIG. 27 is a screenshot of portable document of tax details for a user defined location.

Figure 28:
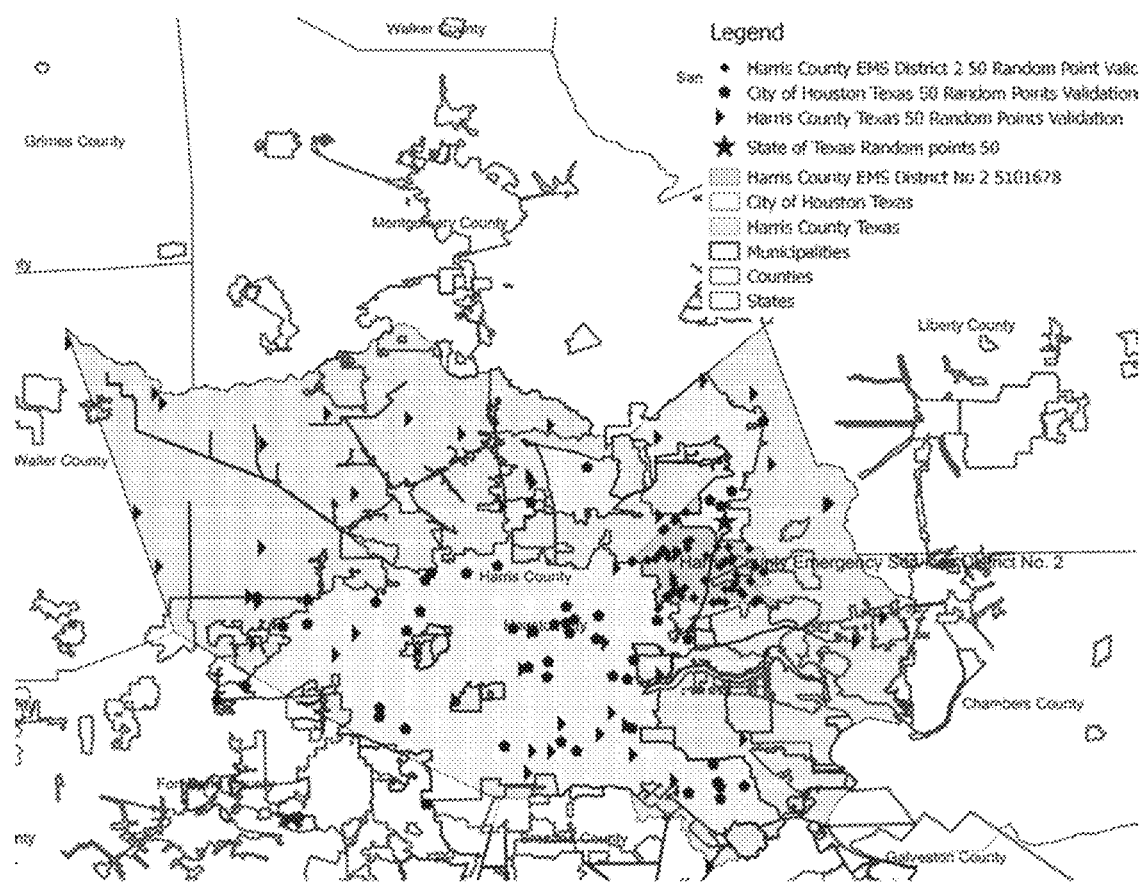
FIG. 28 is a screenshot of the Random Point validation method in Harris County in Texas.

FIG. 28 is a screenshot of the Random Point validation method in Harris County in Texas.

Figure 29:
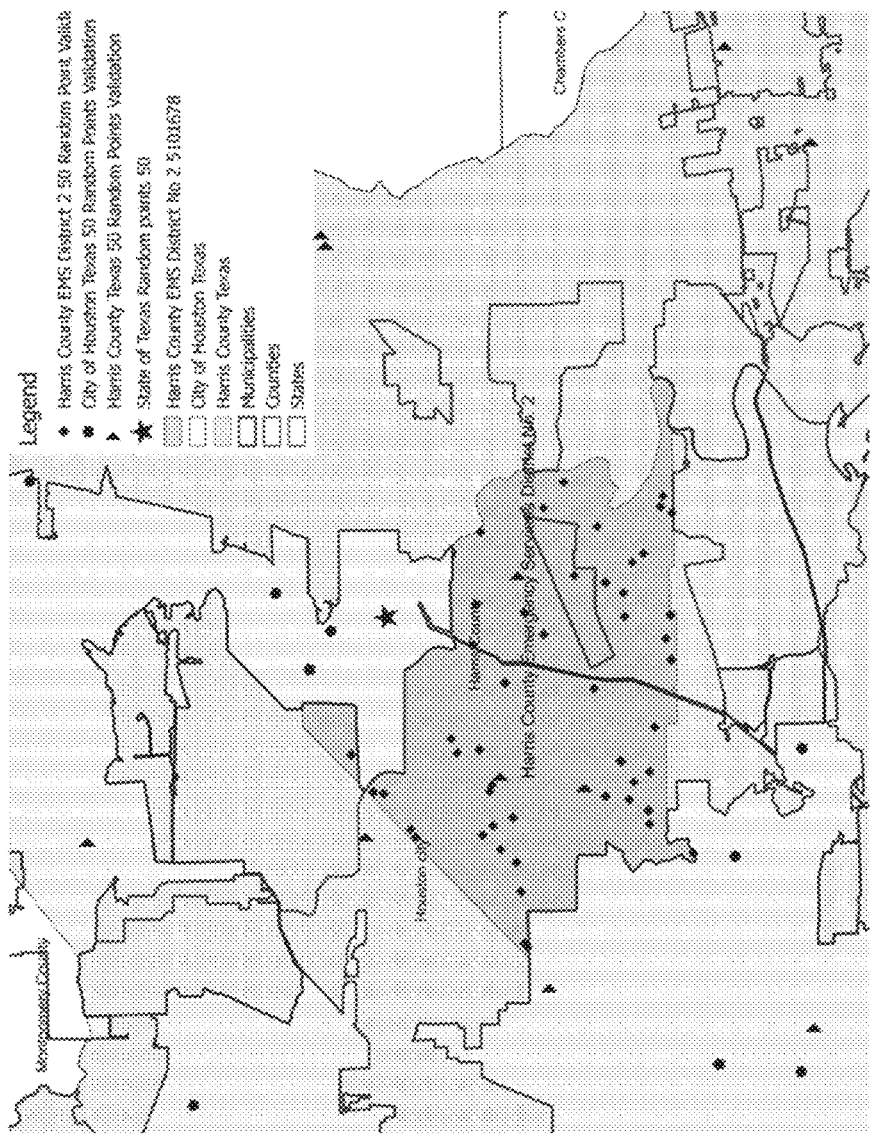
FIG. 29 and is a screenshot of the Random Point validation method in a Special Purpose Tax District ("SPD") in Texas.

FIG. 29 and is a screenshot of the Random Point validation method in a Special Purpose Tax District ("SPD") in Texas.

Figure 30:
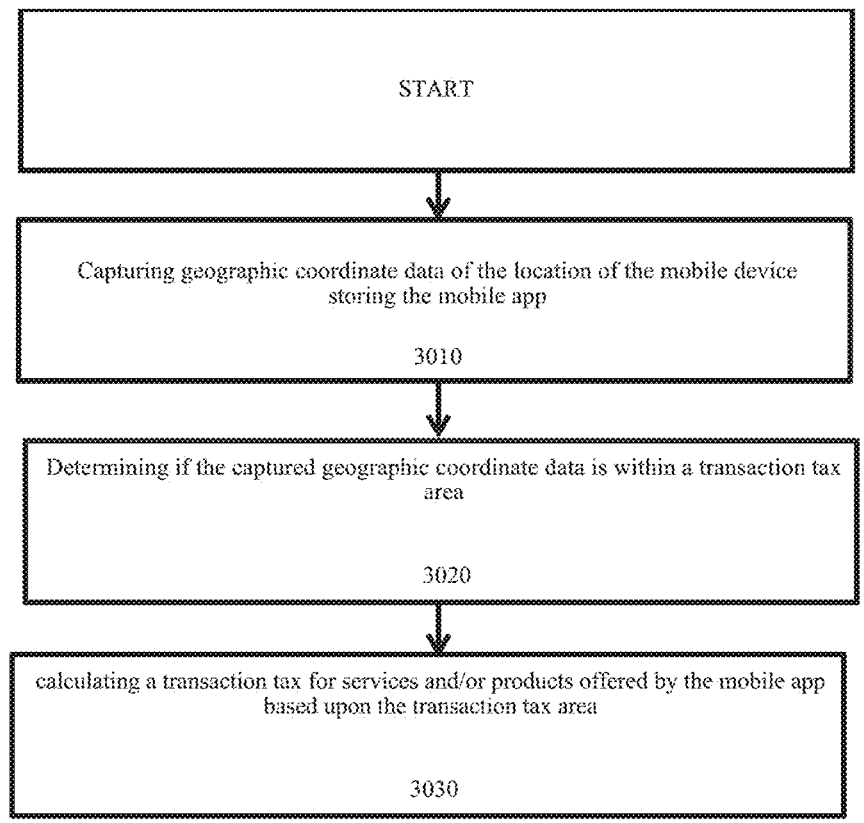
FIG. 30 is a flowchart that illustrates a method for calculating a transaction tax for a mobile app stored on a mobile device.

FIG. 30 is a flowchart of an embodiment of the present invention. FIG. 30 shows method step 3010 of capturing geographic coordinate data of the location of the mobile device storing the mobile app. The geographic coordinate may be known or unknown.

Step 3020 involves determining if the captured geographic coordinate data is within a transaction tax area; and step 3030 involves calculating a transaction tax for services and/or products offered by the mobile app based upon the transaction tax area.

In certain embodiments, the geographic coordinates are examined in a graphical information system for organization, structure, and how the geographic coordinates relate to one or more tax area vector data or one or more tax area databases.

In certain embodiments, the method further comprises performing a spatial operation on the geographic coordinates. In certain embodiments, a geographical information system performs point-in-a-polygon overlay to determine if the geographic coordinates are within the boundary of a tax area or tax area. Here, the step, which can occur via a computer processor or on a memory uses a SQL function to determine if a point is within a polygon of a specific tax area.

In certain embodiments, the step involves triangulating the coordinate via an algorithm to determine the tax rate. In certain embodiments, the algorithm involves using three data points, or more than three data points to triangulate the coordinate.

In certain embodiments, the method involves identification of the tax rate for geographic coordinates that are within the boundary of a tax area or tax areas.

In certain embodiments, the method involves returning to a user or returning to a program the tax rate for a tax area of tax areas that the geographic coordinates are within the boundary of a tax area or tax areas.

In certain embodiments, the method involves having a user elect to save the location to a central location storage system memory.

In certain embodiments of the invention, the figures and sales taxes are linked to related tax tables. Such tax tables can be updated, corrected or modified based upon the year and additional legislation provided by the states that affects tax rates.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A computer-implemented method for calculating a transactional tax of geographic coordinate data, the method comprising:

inputting geographic coordinate data into a geographic information system in a mobile software application on a mobile device;

analyzing the geographic coordinate data by utilizing a feature overlay of coordinate-based data models or vector data in the form of a point, line or polygon that graphically shows the legal boundary of a tax area that is a non-traditional point of sale that does not have a physical human readable address; and performing a spatial type relationship function on the geographic coordinate data to determine if the geographic coordinate data is within the tax area based upon the location of the mobile device or the location where the mobile software application is first used or delivered, wherein the spatial type relationship function includes multiple coordinate-based data models or multiple vector data overlays or layers to determine if the geographic coordinate data is within the tax area, and returning, though a query of a tax rate database, the rate or rates for all tax areas that the point, line or polygon is within to a mobile device if the geographic coordinate data is within the tax areas.

2. The method of claim 1, further comprising a spatial database storage and management system of the tax area consisting of the same attribute and geographic and geometric elements in the tax area vector data.

3. The method of claim 1, wherein the method is based on coordinate-based data models in the form of vector data in the form of a polygon, point or line.

4. The method of claim 1, wherein the method uses at least six decimal places for latitude resulting in a horizontal precision of ±1.11 meters or approximately 3.6 foot radius emanating from the geographic coordinate or precision based on current performance levels specified by the GPS SPS.

5. The method of claim 1, wherein the method uses at least six decimal places for longitude resulting in a horizontal precision of ±0.955 meters or approximately 3.2 foot radius emanating from the geographic coordinate or precision based on current performance levels specified by the GPS SPS.

6. The method of claim 1, wherein the method utilizes a boundary and survey system to collect information about selected legally defined geographic tax areas so that each tax jurisdiction can update boundary and survey changes based on a legal action by the governing authority.

7. The method of claim 1, wherein coordinate-based data models and spatial databases for tax jurisdictions are available from national governments, state governments, county, province, region or parish governments, incorporated places such as cities, towns, villages and any other tax area authorized by law.

8. The method of claim 1, further comprising converting raster data to a coordinate-based data model and to a spatial database in the geographic information system network.

9. The method of claim 1, wherein the geographic coordinate data is selected from a group consisting of latitude or longitude, and/or a vertical coordinate.

10. The method of claim 1, wherein the geographic coordinate data is a vertical coordinate.

11. A computer-implemented method for calculating a transactional tax of geographic coordinate data in a mobile software application, the method comprising:
    entering geographic coordinate data into a geographic information system;
    analyzing the geographic coordinate data by utilizing a feature overlay of coordinate-based data models or vector data in the form of a point, line or polygon that graphically shows the legal boundary of a tax area that is a non-traditional point of sale that does not have a physical human readable address; and
    performing a spatial type relationship function on the geographic coordinate data to determine if the geographic coordinate data is within the tax area based upon the location of the use or delivery of the mobile software application, wherein the spatial type relationship function includes multiple coordinate-based data models or multiple vector data overlays or layers to determine if the geographic coordinate data is within the tax area, and
    returning, though a query of a tax rate database, the rate or rates for all tax areas that the point, line or polygon is within to a mobile device if the geographic coordinate data is within the tax areas.

* * * * *